(12) United States Patent
Pekas

(10) Patent No.: US 8,528,602 B2
(45) Date of Patent: Sep. 10, 2013

(54) MICROVALVE SYSTEM

(76) Inventor: Nikola Pekas, Montreal (CA)

(*) Notice: Subject to any disclaimer, the term of this patent is extended or adjusted under 35 U.S.C. 154(b) by 376 days.

(21) Appl. No.: 12/823,897

(22) Filed: Jun. 25, 2010

(65) Prior Publication Data

US 2011/0043937 A1    Feb. 24, 2011

Related U.S. Application Data

(60) Provisional application No. 61/220,610, filed on Jun. 26, 2009, provisional application No. 61/220,613, filed on Jun. 26, 2009.

(51) Int. Cl.
*F04B 17/00* (2006.01)

(52) U.S. Cl.
USPC .......................... 137/833; 137/831; 417/413.2

(58) Field of Classification Search
USPC ................................ 137/831, 833; 417/413.2
See application file for complete search history.

(56) References Cited

U.S. PATENT DOCUMENTS

| | | | |
|---|---|---|---|
| 7,216,671 B2 * | 5/2007 | Unger et al. ................... | 137/833 |
| 2003/0087198 A1 | 5/2003 | Dharmatilleke et al. | |
| 2007/0164427 A1 | 7/2007 | Sauciuc et al. | |
| 2008/0264506 A1 | 10/2008 | Beerling et al. | |
| 2008/0289710 A1 | 11/2008 | Unger et al. | |

FOREIGN PATENT DOCUMENTS

| | | |
|---|---|---|
| EP | 1279639 | 1/2003 |
| WO | 2006044458 | 4/2006 |
| WO | 2008052363 | 5/2008 |

OTHER PUBLICATIONS

Journal of Microelectromechanical Systems, vol. 15. No. 4, Aug. 2006.
Nanoscale and Microscale Thermophysical Engineering, 11:99-108, 2007.
Adv. Funct. Mater. 2008, 18, 1097-1104.
Applied Physics Letters 92, 011904 (2008).
"Electrostatic Hydraulic ThreeWay Gas Microvavle for High-Pressure Applications", Twelfth International Conference on Miniaturized Systems for Chemistry and Life Sciences, Oct. 12-16, 2008.
"Gallium Containing Indalloy-Non Standard Metals", MSDS-IN 000, Sep. 10, 2007.
Safety Data Sheet acc, to Guideline 93/112/EC; Supersedes the Safety Data Sheet dtd, Apr. 5, 2004.

* cited by examiner

*Primary Examiner* — Charles Freay
*Assistant Examiner* — Patrick Hamo
(74) *Attorney, Agent, or Firm* — Norton Rose Fulbright Canada LLP

(57) ABSTRACT

There is described a microvalve system having a first body portion having a fluid channel defined in a face, an electrode disposed in the fluid channel and electrically connectable to a power source, a channel membrane disposed over the fluid channel and aligned with the electrode, and a second body portion disposed on the first body portion, the first body portion comprising a liquid receiving cavity aligned with the membrane. The liquid receiving cavity is adapted to receive an electrical conducting liquid that is electrically connectable to the power source. The channel membrane is displaceable towards the electrode upon application of an electrical potential difference between the electrode and the electrical conducting liquid in order to at least partially obstruct the fluid channel.

11 Claims, 15 Drawing Sheets

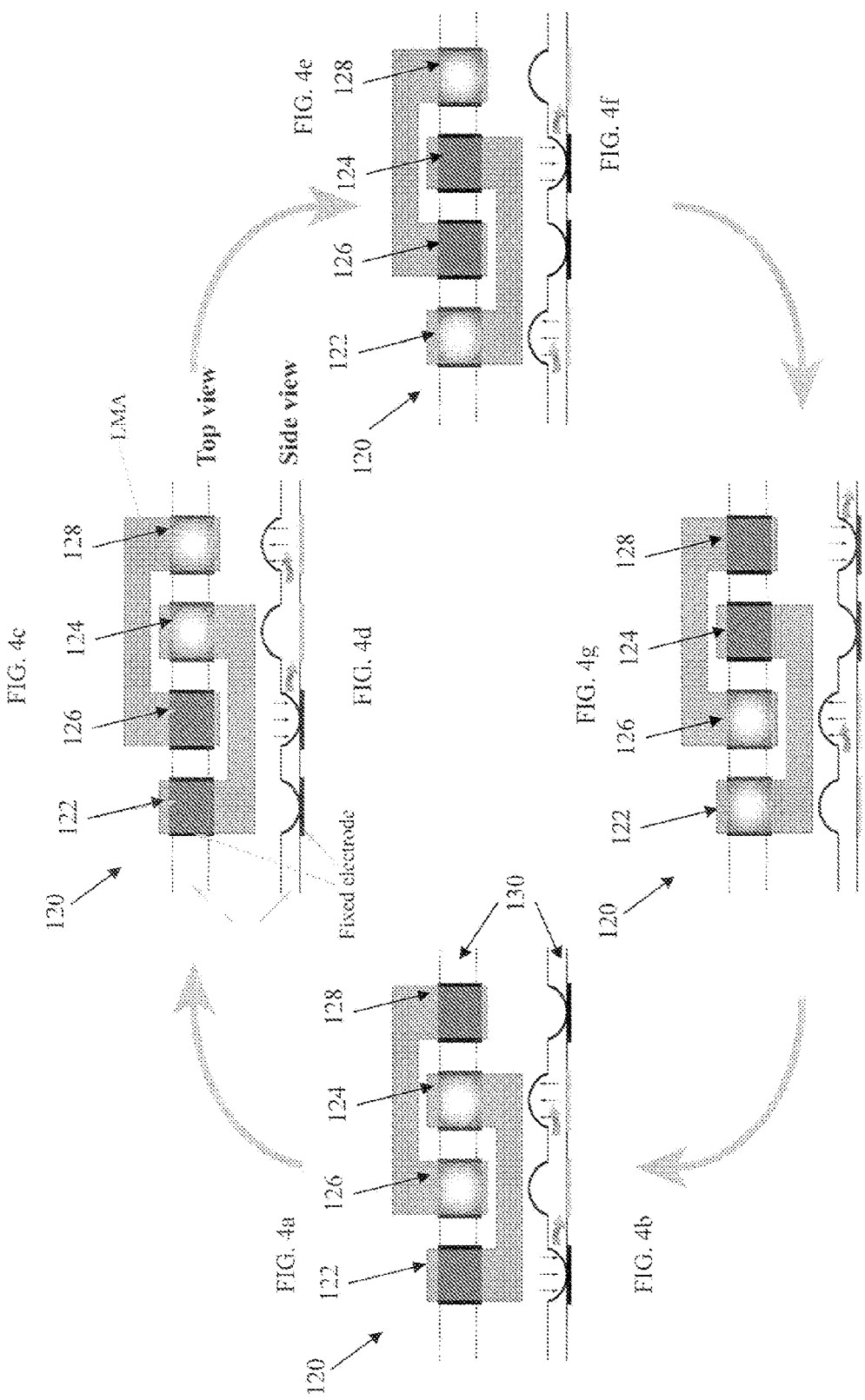

MICROVALVE SYSTEM

CROSS-REFERENCE TO RELATED APPLICATIONS

The present application claims priority under 35 USC §119 (e) on U.S. Provisional Patent Application Ser. No. 61/220,610 filed on Jun. 26, 2009 and on U.S. Provisional Patent Application Ser. No. 61/220,613 filed on Jun. 26, 2009, the entire content of both of which is incorporated herein by reference.

TECHNICAL FIELD

The present invention generally relates to microstructures and microfluidics, and more particularly to an actuator such as a microvalve for use in a microfluidic device or an adaptive mirror, and methods of forming the microstructures used therewith.

BACKGROUND

Lab-on-a-chip and micro-total-analysis systems have experienced a significant increase in interest in the biomedical and chemistry areas during the last decade. Effort has been made to develop new technologies enabling labs to be shrunk and integrated onto single chips. This emerging technology has proven to be very promising, and is often referred as "microfluidics". Microfluidics allows fluid flow control and mixing of fluids on chips using microchannels, into which fluids are injected. Such chips integrate many functions on a single substrate which not only allows an entire experiment to be built on a small chip, but also allows a large amount of parallel experiments to be performed simultaneously using very small volumes of fluids in a limited amount of time.

Microfluidic circuits require microvalves, i.e. tiny valves that are one of the key building blocks for making complex microfluidic integrated circuits. Microvalves are used to direct and pump fluids. Typically, the microvalve is used to block, open, or regulate the passage of the fluid in the microchannel.

For example, certain known microvalves comprise a membrane which is displaced into a channel by electrostatic force in order to control the flow of a fluid propagating in the channel. A solid film of electrically conductive material electrode is typically deposited on the membrane in order to form a first of two solid electrodes. However, because of the stretching of the membrane, the electrode layer is subject to delamination and fatigue problems, in addition to limiting the stretching of the membrane.

Additionally, for such microvalves to successfully operate, the channels within which they are formed must be accurately formed. Challenges often exist with the microfabrication of the substrates within which the microcircuits are formed. For example, when using usual wet-etching techniques to form channels in a substrate, the sidewalls of the etched structures in amorphous material tend to be rounded. It can however be desired to form a straight or angled sidewall, which is difficult with known etching techniques.

Therefore, there remains a need for improved microfluidic devices.

SUMMARY

In accordance with a first aspect, there is provided a microvalve system comprising: a first body portion having a fluid channel defined in a face thereof; an electrode layer disposed on the first body portion within said fluid channel, the electrode layer being electrically connectable to a power source; a first membrane disposed on the face of the first body portion covering said fluid channel in alignment with said electrode, the first membrane sealingly enclosing the fluid channel; and a second body portion disposed on said face of said first body portion, said second body portion comprising a liquid receiving cavity aligned with said first membrane such that the first membrane separates the fluid channel and the liquid receiving cavity, said liquid receiving cavity containing an electrical conducting liquid therein, an electrical contact being disposed at least partially within the liquid receiving cavity in electrical communication with the electrical conducting liquid and being electrically connectable to said power source; said first membrane being displaceable between an open valve position, wherein fluid is free to flow through said fluid channel, and an at least partially closed valve position, wherein the first membrane is displaced towards the electrode layer within the fluid channel upon application of an electrical potential difference between said electrode layer and said electrical conducting liquid in order to at least partially obstruct said fluid channel.

In accordance with another aspect, there is provided a microvalve system comprising: a bottom substrate having a channel in a top face; an electrode disposed in said channel and electrically connectable to a power source; a channel membrane disposed on top of said channel and aligned with said electrode; a top substrate disposed on top of said bottom substrate, said top substrate comprising a liquid receiving cavity aligned with said membrane; an electrical conducting liquid contained in said liquid receiving cavity and electrically connectable to said power source; and said channel membrane being displaceable between an open channel position and an at least partially closed channel position upon application of an electrical potential difference between said electrode and said electrical conducting liquid.

In accordance with a further broad aspect, there is provided a microvalve system comprising a fixed electrode disposed within a fluid receiving channel, an elastic membrane separating the fluid receiving channel and a sealed cavity containing an electrical conducting liquid, the electrical conducting liquid and the fixed electrode being adapted to be electrically connectable to a power source, said elastic membrane forming a valve which is displaceable between an open position, wherein the fluid receiving channel is unobstructed, and an at least partially closed position, wherein the fluid receiving channel is at least partially obstructed by said elastic membrane when the elastic membrane is displaced toward the fixed electrode upon application of an electrical potential difference between said fixed electrode and said electrical conducting liquid.

There is additionally provided, in accordance with another aspect, a method for regulating a flow of a fluid in a microfluidic device, comprising: providing a microvalve having a bottom substrate with a fluid channel defined therein and an electrode disposed in the fluid channel, a channel membrane enclosing said fluid channel and aligned with said electrode, a top substrate disposed on top of said bottom substrate and having a liquid receiving cavity aligned with said channel membrane, and an electrical conducting liquid being contained in said liquid receiving cavity; propagating the fluid in said fluid channel; and applying an electrical potential difference between said electrode and said electrical conducting liquid to displace said channel membrane with respect to said electrode, thereby at least partially restricting the opening of the microvalve such as to control the flow of said fluid.

There is also provided a method of reflecting light, comprising: providing a microvalve device comprising a bottom substrate having a fluid channel and an electrode disposed therein, a channel membrane enclosing said fluid channel and aligned with said electrode, a top substrate disposed on top of said bottom substrate and having a liquid receiving cavity aligned with said channel membrane, said second body portion comprising an opening emerging from said liquid receiving cavity and an additional membrane hermetically closing said opening, and an incompressible and electrical conducting liquid being contained in said liquid receiving cavity and acting as a hydraulic transmission medium between said channel membrane and said additional membrane, said liquid and said additional membrane forming a mirror; propagating light towards said additional membrane; and applying an electrical potential difference between said electrode and said liquid to displace said channel membrane with respect to said electrode, thereby controlling a curvature of said mirror and a reflection direction for light reflected by said mirror.

There is further still provided a microfluidic pump comprising: a first body portion having a fluid channel defined in a face; at least three channel membranes disposed over said fluid channel at different locations along a length thereof; at least three electrodes disposed in said fluid channel, aligned with a respective one of said at least three channel membranes, and electrically connectable to a power source; a second body portion disposed on said first body portion, said first body portion comprising at least three liquid receiving cavities aligned with a respective one of said at least three channel membranes, each said liquid receiving cavities being adapted to receive an electrical conducting liquid electrically connectable to said power source, each one of said at least three channel membranes being displaceable between an open channel position and an at least partially closed channel position upon application of an electrical potential difference between a corresponding one of said two electrodes and said electrical conducting liquid in order to sequentially close said fluid channel and pump a fluid in said fluid channel.

There is further provided a method for etching a substrate comprising: providing a chip comprising a substrate, a sacrificial layer, and a patterning layer respectively superimposed one on top of another, said sacrificial layer and said patterning layer forming a bilayer mask having an opening at least through said patterning layer, said patterning layer being resistant to a substrate etchant; and concurrently etching said substrate and said sacrificial layer through said opening to create a cavity having inclined sidewalls in said substrate, an inclination angle of said inclined sidewalls being determined by a first etching rate of said sacrificial layer and a second etching rate of said substrate.

There is further provided a method for etching a cavity having inclined sidewalls in a substrate, comprising: determining a substrate etchant, a sacrificial material and a patterning material adapted to a material of said substrate, said material of said substrate being etchable by said substrate etchant and said patterning material being substantially resistant to said substrate etchant; determining a thickness for a sacrificial layer in accordance with at least an inclination angle for said inclined sidewalls and a reaction rate for said material of said substrate with said substrate etchant; providing a chip comprising said substrate, said sacrificial layer made of said sacrificial material and having said thickness, and a patterning layer made of said patterning material respectively one on top of another, said sacrificial layer and said patterning layer forming a bilayer mask superimposed on said substrate and having an opening at least through said patterning layer; and concurrently etching said substrate and said sacrificial layer through said opening to create said cavity having said inclined sidewalls in said substrate.

The term "microfluidics" refers to the manipulation and transport of minute amount of fluids. A microfluidic device is a device capable of comprising minute amount of fluids therein.

The term "fluid" is used to refer to either a liquid or gaseous substance, or a combination thereof, or a suspension of solid particles in a gas or a liquid.

The term "channel" refers to any recess, cavity, or a number of these recesses or cavities interconnected, adapted for containing and/or transporting a fluid.

BRIEF DESCRIPTION OF THE DRAWINGS

Further features and advantages will become apparent from the following detailed description, taken in combination with the appended drawings, in which:

FIGS. 4a, 4c, 4e, and 4g, and 4b, 4d, 4f, and 4h are respectively top and side views of a schematic peristaltic pump comprising two pairs of coupled microvalves in four different states to illustrate the functioning of the peristaltic pump;

It will be noted that throughout the appended drawings, like features are identified by like reference numerals.

DETAILED DESCRIPTION

Miniaturization, integration and parallelization (MIP) has driven the (micro) electronic revolution and has started to bear strongly on the life sciences, and already revolutionized gene expression profiling with DNA microarrays and genotyping with high throughput sequencers. The cell is the minimal physiological functional unit, yet of extraordinary complexity as it contains 23000 genes (for humans) and many more different proteins and protein machines. Cells have recently become an important focus of the drug discovery processes following the increasing rate of failures of drugs in late clinical trials or even following market introduction. High throughput cell assays can now be performed automatically in 96 or 384 well plates, and this process is referred to as high content screening (HCS) because it can provide insight on multiple biochemical pathways. HCS is an extension of high throughput screening (HTS) which examines individual bimolecular interactions outside of the cell. HCS is challenging because it requires a tight control of environmental parameters, the delivery of multiple reagents, advanced microscopy, and multi-parameter readouts; consequently it is expensive. Yet HCS represents an annual market value of hundreds of millions of USD, with a rapid growth rate of above 20% annually. The pressure on identifying adverse side effects of drugs early in the drug development process fuels a rapidly rising demand for HCS in the pharmaceutical and biotech industries. There are no intrinsic biological barriers to the further miniaturization and parallelization of HCS and of cellular assays within microfluidic systems, except for the lack of a microfluidic technology that supports MIP on a large scale.

For at least these reasons, the present description proposes a new microvalve, and the application of this microvalve to microfluidic systems that renders the latter scalable, and that may be used for cell assays and HCS, for example. The microvalve described herein is an improvement of the microvalve described in Applicant's International Patent Application No. PCT/CA2007/001997 filed Nov. 5, 2007 and published as WO 2008/052363 A1 on May 8, 2008, the entire content of which is incorporated herein by reference. Furthermore, the microfluidic device of the present application regulates the flow of a fluid in a manifold connected to flexible membrane valves which control the flow of sample fluids. This architecture permits integration of microelectronic integrated circuits (ICs) with microfluidics and hence opens the door to large scale MIP of microfluidics.

Figure 1A:
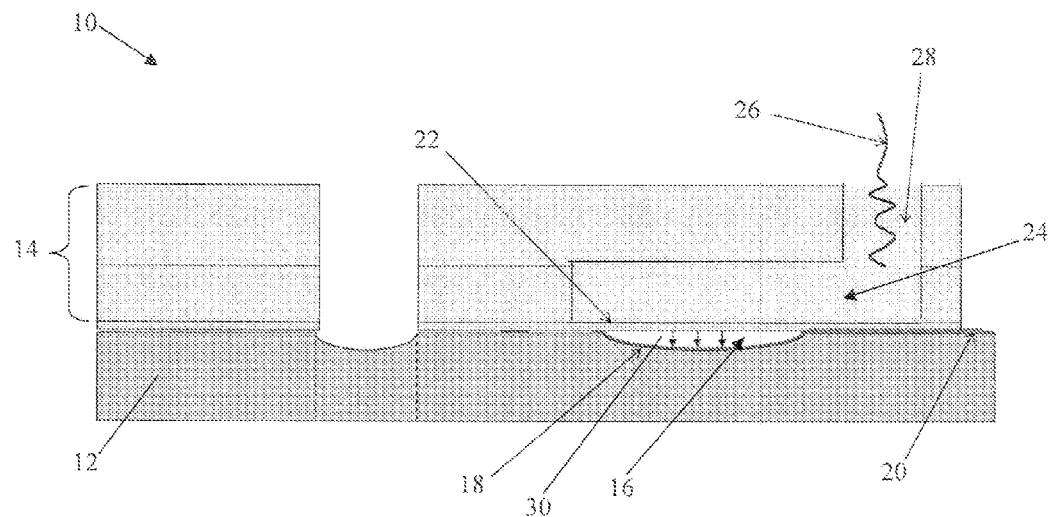
FIG. 1A is a schematic cross-sectional view of a microvalve system comprising a single microvalve for regulating the flow of a fluid, the microvalve being in an open position.

FIG. 1A illustrates one embodiment of a microvalve system 10 to be used in a microfluidic device. The system 10 comprises a bottom substrate 12 and a top substrate 14 disposed one on top of the other. The bottom substrate 12 comprises a channel 16 in its top face. An electrode layer 18 is disposed in the cavity 16 and is electrically connected to a first electrical contact 20. An elastic membrane 22 is secured to the substrate 12 so that it bridges the channel 16 along at least a portion of the length of the channel 16. The top substrate 14 comprises a cavity 24 which is aligned with the membrane 22 and the channel 16. A second electrical contact 26 is positioned within the cavity 24 and may be secured to the top substrate 14.

The cavity 24 is filled with an electrical conducting liquid 28 provided in an adequate amount. When contained in the cavity 24, the electrical conducting liquid 28 is in contact with the top face of the membrane 22 and the second electrical contact 26, and acts as a liquid electrode. By connecting the first and second electrical contacts 20 and 26 to a power source (not shown), the fixed electrode 18 and the electrical conducting liquid 28, which are disposed on opposite sides of the elastic membrane 22, can be brought to two different electrical potentials, thereby creating a difference of electrical potential between the electrode 18 and the electrical conducting liquid 28.

Figure 1B:
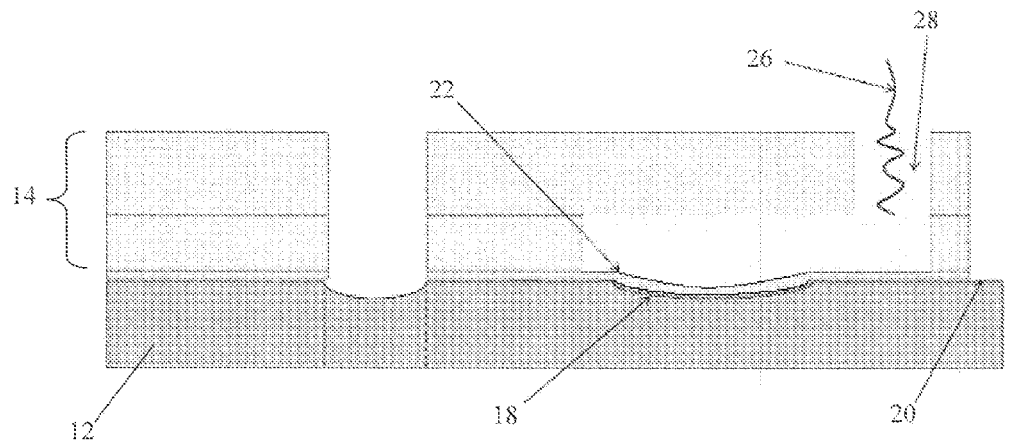
FIG. 1B is a schematic cross-sectional view of the microvalve system of FIG. 1A, in which the microvalve is in a closed position.

A fluid 30 of which the flow is to be regulated is disposed within the channel 16 and propagates therein. It should be noted that the membrane 22 is hermetically attached to the substrate 12 so that no fluid 30 can pass between the membrane 22 and the bottom substrate 12 and the liquid 28 cannot leak into the channel 16. The flow of the fluid 30 is controlled by the position of the membrane 22 with respect to the channel 16. Using the power source connected to the first and second electrical contacts 20 and 26, a difference of electrical potential is created between the electrical conducting liquid 28 and the electrode 18. This difference of electrical potential generates an electrostatic attraction force between the electrode 18 and the electrical conducting liquid 28. As a result, the electrical conducting liquid 28 exerts a pressure on the membrane 22. Because it is elastically deformable, the membrane 22 is displaced towards the fixed electrode 18 if the pressure exerted by the electrical conducting liquid 28 on the top face of the membrane 22 is superior to the combination of the pressure exerted by the fluid 30 within the channel 16 on the bottom face of the membrane 22 and the elastic force in the membrane (i.e. the membrane's elasticity). Depending on the voltage, i.e. the difference of electrical potential, applied to the electrical contacts 20 and 26, the membrane 22 can partially obstruct the channel 16 or completely obstruct the channel 16. If the voltage applied to the microvalve 10 is not sufficient to create an attraction force superior to the pressure force exerted by the fluid 30 on the membrane 22, the membrane 22 substantially does not move and the flow of the fluid 30 remains substantially unchanged and corresponds to the maximum fluid flow. By increasing the voltage so that the generated attraction force is superior to the force exerted by the fluid 30 on the membrane 22 and the elastic force in the membrane 22, the membrane 22 moves downwards and partially obstructs the channel 16, thereby decreasing the flow of the fluid 30 flowing in the channel 16. By further increasing the voltage up to an adequate voltage value, the displacement of the membrane 22 increases and the membrane 22 abuts the electrode 18, thereby hermetically obstructing the channel 16 and preventing the fluid 30 from flowing through the channel 16 as illustrated in FIG. 1B. By stopping the application of the voltage, the electrode 18 and the electrical conducting liquid 28 go back to the same electrical potential, thereby canceling the electrostatic attraction force. Due to its elasticity and/or the pressure of the fluid 30, the membrane 22 returns to its initial position as shown in FIG. 1A. Therefore, the flow of the fluid 28 in the channel 16 can be gradually varied from a maximum flow to zero flow, and vice versa, by applying an adequate voltage to the electrical contacts 20 and 26, thereby creating an adequate difference of electrical potential between the electrical conducting liquid 28 and the electrode 18.

In one embodiment, the membrane 22 is stretched or tightened before being secured to the bottom substrate 12. This pre-stretching of the membrane 22 introduces an additional tension or elastic force in the membrane 22, resulting in an increased stiffness for the membrane 22 which affects the threshold electrostatic force needed for moving the membrane 22.

Figure 2A:
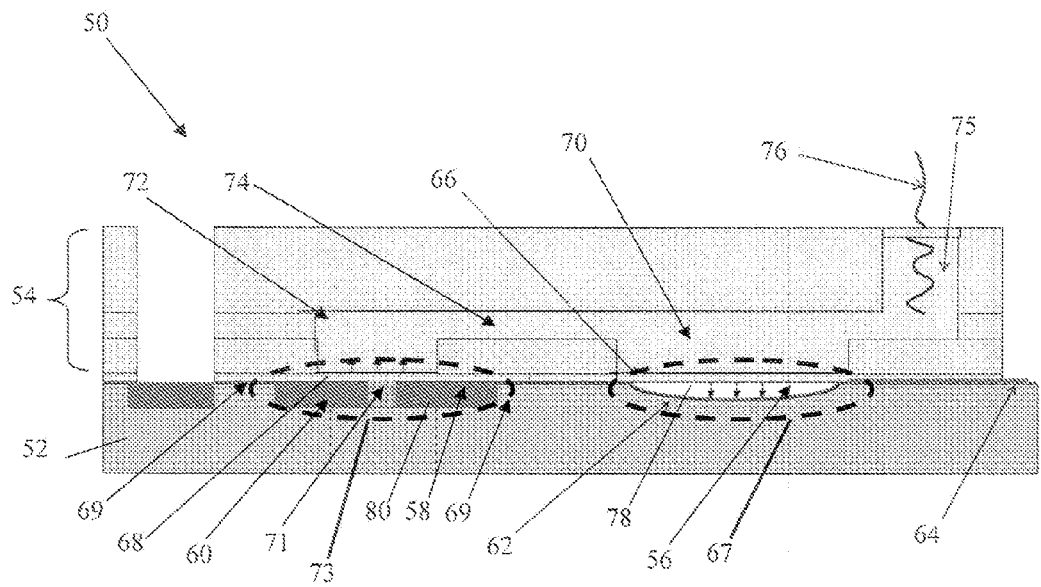
FIG. 2A is a schematic cross-sectional view of another embodiment of a microvalve system comprising a first microvalve and a second microvalve for regulating the flow of fluids, the first microvalve being open and the second microvalve being closed.

FIG. 2A illustrates a further embodiment of a microvalve system 50 to be used in a microfluidic device. The system 50 comprises a bottom substrate 52 and a top substrate 54 disposed on top of the bottom substrate 12. The bottom substrate 52 comprises a first channel 56, a second channel 58, and a third channel 60 in its top face with the second and third channels 58 and 60 positioned adjacent to each other. The second and third channels 58 and 60 are separated by a valve seat portion 71. An electrode layer 62 is disposed in the cavity 56 and fixedly secured to the substrate 52. The electrode 62 is electrically connected to a first electrical contact 64 which is secured to the substrate 52 and electrically connectable to a power source. A first elastic membrane 66 is fixedly secured on the substrate 12 so that it bridges the channel 56. The membrane 66 and the channel 56 form a valve 67. A second elastic membrane 68 is fixedly secured on the top face of the substrate 52 so that it bridges at least portions of both the second and third channels 58 and 62. The membrane 68 is fixedly and hermetically secured to the edges 69 of the channels 58 and 60 while being unsecured to the valve seat portion 71 of the substrate 52 located between the channels 58 and 60. The membrane 68 is under tension in order to hermetically engage the valve seat portion 71 of the substrate 52 so no fluid can pass from the channel 58 to the channel 60, and inversely. The membrane 68 and the channels 58 and 60 form a second valve 73.

The top substrate 54 comprises a first cavity 70 and a second cavity 72 fluidly connected together by a passageway 74. When the top substrate 54 is positioned on top of the bottom substrate 52, the first cavity 70 is aligned with the membrane 66 and the electrode 62, and the second cavity 72 is aligned with the second membrane 68.

The chamber formed by the cavities 70, 72, and the passageway 74 is filled with a substantially incompressible and electrical conducting liquid 75. The chamber is closed and hermetically sealed so that no liquid 75 can exit the chamber. A second electrical contact 76 is present in the chamber to apply a desired electrical potential to the liquid 75. The volume of the liquid 75 contained in the chamber is substantially equal to the volume of the chamber so that the liquid 75 substantially occupies all of the space available in the chamber. Since the liquid 75 is substantially incompressible and the chamber is hermetically closed, the volume of the liquid 75 is fixed and constant. Any displacement in one direction of one of the two membranes 66 and 68 causes a corresponding displacement of the other membrane 66, 68 in an opposite direction. As a result, the liquid 75 acts as a hydraulic transmission medium between the membranes 66 and 68, and the two membranes 66 and 68 are thereby passively coupled together (i.e. by the hydraulic transmission medium 75). Because of the passive coupling, one of the membranes 66, 68 can be passively displaced by actively displacing the other of the membranes 66, 68. It should be understood that air should be excluded from the chamber as much as practically possible.

The channel 56 is adapted to receive a first fluid 78 while the channels 58 and 60 are adapted to receive a second fluid 80. The second fluid 80 is capable of flowing from the channel 58 to the channel 60 when the second valve 73 is in an open position. The microvalve system 50 is used for regulating the flow of the fluids 78 and 80 in an opposite manner, i.e. when the microvalve 67 is open as seen in FIG. 2A, thereby allowing the fluid 78 to flow in the channel 56, the microvalve 73 is closed, thereby preventing any flow of the fluid 80 from the channel 58 to the channel 60. As the membranes 66 and 68 are hermetically attached to the bottom substrate 52, the liquid 75 contained in the chamber does not leak into the channels 56, 58, and 60, and the fluids 78 and 80 contained in the channels 56, 58, and 60 does not enter into the chamber.

Figure 2B:
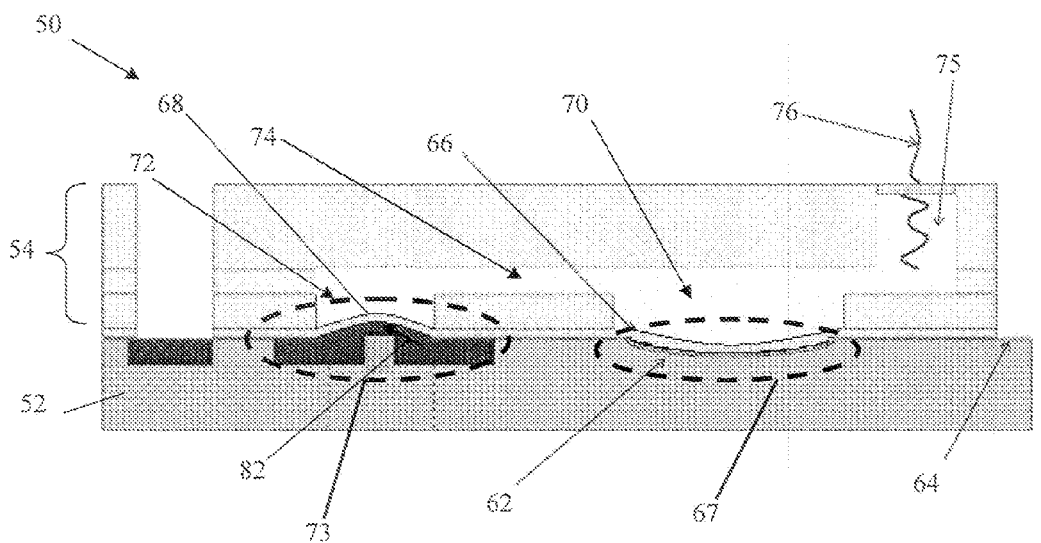
FIG. 2B is a schematic cross-sectional view of the microvalve system of FIG. 2A in which the first microvalve is closed and the second microvalve is open.

As described above, the position of the membrane 66 with respect to the cavity 56 is controlled by applying an adequate voltage between the electrical contacts 64 and 76. As a result of the applied voltage, a difference of electrical potential between the electrode 62 and the liquid 75 contained in the chamber is created, and this difference of potential generates an electrostatic attraction force between the liquid 75 and the electrode 62. As a result of the attraction force, the membrane 66 is stretched and moves towards the electrode 62. Because the two membranes 66 and 68 are passively coupled, a displacement of the first membrane results in a concurrent opposite displacement of the second membrane 68. When no voltage is applied to the electrical contacts 64 and 76, both membranes 66 and 68 are un-stretched and the microvalves 67 and 73 are in their normal position, as seen in FIG. 2A. Because the membrane 68 hermetically adheres to the portion 71 of the substrate 52, both channels 58 and 60 are hermetically closed so that the fluid 80 cannot pass from the second channel 58 to the third channel 60. The microvalves 67 and 73 are respectively referred to as a normally open microvalve and a normally closed microvalve since the fluid 78 is free to flow through the channel 56 and the fluid 80 is prevented from flowing between the channels 58 and 60 when no voltage is applied. When the applied voltage reaches a given threshold, the generated attraction force between the liquid 75 and the electrode 62 is sufficient for displacing the membrane 66 towards the electrode 62, thereby at least reducing the flow of the fluid 78 in the channel 56. Since the two membranes 66 and 68 are passively coupled by the liquid 75, the downward displacement of the membrane 66 results in a concurrent upward displacement of the membrane 68. As the result, the membrane 68 is raised and the fluid 80 is free to flow from the channel 58 to the channel 60 as illustrated by arrow 82 in FIG. 2B. The threshold electrostatic force needed for moving the membranes 66 and 68 depends on the stiffness of the two membranes 66 and 68, and the force exerted on the membrane 66 due to any pressure difference between the fluid 78 and the fluids 58 and 60. The stiffness of the membrane 66, 68 depends on factors such as the membrane thickness, the membrane material, the membrane shape and size, etc. Increasing the applied voltage increases the flow of the fluid 80 from the second channel 58 to the third channel 60, and reduces the flow of the fluid 78 in the channel 56. The maximum flow of the second fluid 80 is obtained when the first membrane 66 directly abuts the electrode 62 and hermetically closes the channel 56, as shown in FIG. 2B. In this case, the fluid 78 is prevented from propagating in the channel 56.

In one embodiment, a further fixed electrode (not shown) is disposed on the valve seat 71. This further electrode is connected to an additional power source which is also electrically connected to the electrical conducting liquid 75. By applying a voltage difference between this additional electrode and the electrical conducting liquid 75, an electrostatic force is created between the further electrode and the liquid 75. As a result of this electrostatic force, the membrane 68 is moved towards the valve seat, resulting in the closing of the microvalve 73 and the opening of the microvalve 67.

In one embodiment, the membrane 66 and/or the membrane 68 is (are) stretched or tightened before being secured to the bottom substrate 52. This pre-stretching of the membrane 66, 68 introduces an additional tension or elastic force in the corresponding membrane, resulting in an increased stiffness for the corresponding membrane which affects the threshold electrostatic force needed for moving the membranes 66 and 68.

While in the present description, the second fluid 80 propagates from the channel 58 to the channel 60, it should be understood that the second fluid 80 can flow from the channel 60 to the channel 58. While in the embodiment illustrated in FIG. 2 two separate membranes 66 and 68 are used, it should be understood that the two membranes 66 and 68 may integral, i.e. part of a single membrane.

In one embodiment, the extremities of the channel 56 are hermetically closed such that the fluid 78 is stationary in the channel 56. In this case, the fluid 78 is compressible and the microvalve system 50 is only used for controlling the flow of the fluid 80. The flow of the fluid 80 from the channel 58 to the channel 60 or from the channel 60 to the channel 58 is regulated by controlling the position of the membrane 66. It should be understood that any compressible fluid, such as air or any gas, can be used for the compressible fluid 78. Alternatively, at least one of the extremities of the channel 56 may be open, thereby allowing the fluid 78 to move freely or with some resistance when the membrane 66 is deformed.

In an alternate embodiment, the channels 58 and 60 may be substituted by a single channel, such as channel 56 for example, and the membrane 68 bridges this single channel along at least a portion of its length. This single channel is referred to as the substitution channel hereinafter. The substitution channel is provided with an additional electrode aligned with the membrane 68. In this case, when a difference of electrical potential is applied between the additional electrode and the electrical conducting liquid 75, the electrode 62 of the valve 67 is set to the same electrical potential than that of the electrical conducting liquid 75. As a result, the membrane 68 abuts the additional electrode of the substitution channel, thereby preventing the fluid 80 from propagating in the substitution channel, and the membrane 66 is spaced away from the electrode 62, thereby allowing the fluid 78 from propagating in the channel 56. When a difference of electrical potential is applied between the electrode 62 and the electrical conducting liquid 75, the additional electrode of the substitution channel is set to the same electrical potential as that of the electrical conducting liquid 75. As a result, the membrane 66 abuts the electrode 62 of the channel 56, thereby preventing the fluid 78 from propagating in the channel 56, and the membrane 68 is spaced away from the additional electrode, thereby allowing the fluid 80 from propagating in the additional channel.

Any electrical conducting liquid which allows the creation of an electrical charge in the vicinity of the membrane when an electrical potential is applied thereto can be used in the microvalve 10, 50. Electrical conducting liquids comprise metals or combination of metals being in liquid phase at the temperature of use of the microvalve system. For example, liquid metal alloys (LMAs) can be used. Mercury-based LMAs or Gallium-based LMAs comprising Indium (In), Zinc (Zn), Tin (Sn), and the like are examples of possible electrical conducting liquids. Gallium-based LMAs present good electrical conductivity and relatively low viscosity. Furthermore, they are not considered toxic. Ionic solutions, such as salted water, for example, can also be used as electrical conducting liquids.

It should be understood that the electrical conducting liquid used for the microvalve system 50 is substantially incompressible in order to act as a hydraulic transmission medium. Since they are substantially incompressible, LMAs are examples of electrical conducting liquids adapted to the microvalve system 50.

It should be noted that the cavities 24, 70, and 72 are hermetically separated from the channels 16, 56, and 58 and 60, respectively, so that the fluids propagating in the channels 16, 56, and 58 and 60 cannot enter in the cavities 24, 70, and 72, respectively, and the electrical conducting liquid contained in the cavities 24, 70, and 72 cannot leak in the channels 16, 56, and 58 and 60, respectively.

It should be noted that the membrane 22, 66, 68 can be made of any adequate elastic and dielectric material preventing the permeation of the electrical conducting liquid 28, 75 and the fluids 30, 78, 80. Examples of adequate materials for the membrane 22 are polydimethylsiloxane, Polyurethane, PolyMethyl MethAcrylate (PMMA), Polycarbonate, perfluoropolymers, photoresists such as SU-8 photoresist for example, parylene, $SiO_2$, $Si_3N_4$, and the like. The electrode 18, 62 can be made of any adequate electrical conducting material such as C, Al, Cr, Ti, Au, Cu, conductive polymer, and the like. The bottom and top substrates can be made of any adequate dielectric material such as glass, silicon, or PMMA.

Figure 3A:
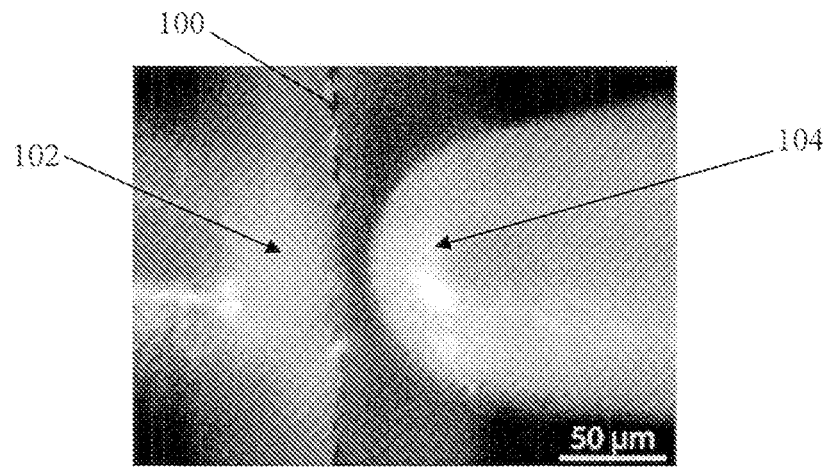
FIGS. 3A-3C are photographs of a membrane position for different applied voltage values.
Figure 3B:
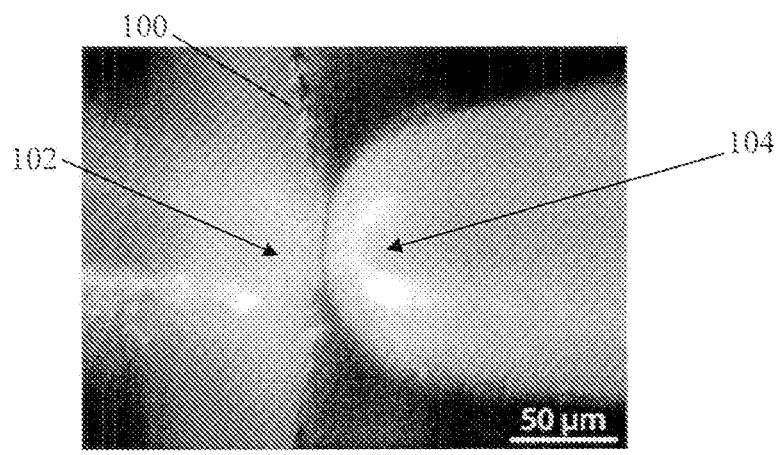
Figure 3C:
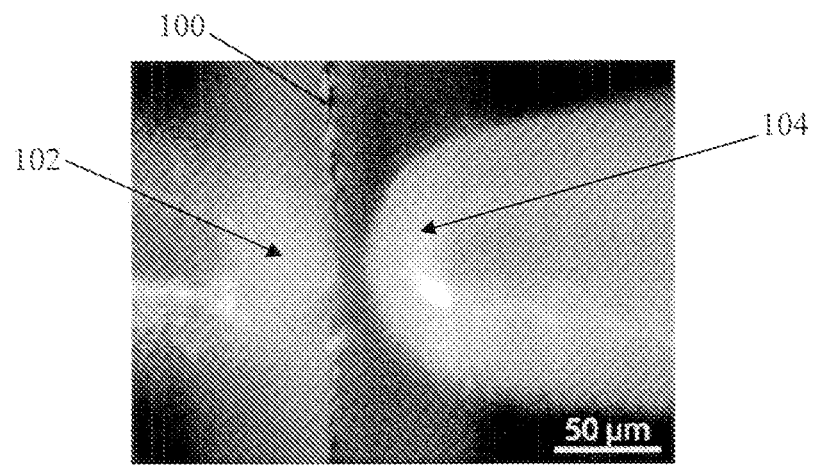

FIGS. 3A-3C show photographs of an actuator test comprising a membrane 100 when different differences of electrical potentials are applied between an electrical conducting liquid 102 and an electrode 104. In FIG. 3A, no voltage is applied and the membrane 100 and the electrode 104 are spaced apart by a gap. In FIG. 3B, a given voltage is applied and the membrane 100 is stretched to engage the electrode 104. When the voltage is suppressed, the membrane 100 goes back to its initial position due to its elasticity, as illustrated in FIG. 3C.

In one embodiment, the voltage applied to the microvalve system 10, 50 is between 0 and 300 volts.

In one embodiment, a direct current (dc) voltage is applied to the microvalve system 10, 50. Alternatively, an alternate current (ac) voltage can be applied. In this case, the voltage signal can vary in frequency and/or duty cycle leading to pulse-width modulation. By appropriately choosing the frequency and/or the duty cycle, the membrane can take an intermediate position to partially obstruct its corresponding channel.

In one embodiment, the microvalve system 10, 50 is integrated in an electronic microfluidic chip which will allow cellular assays and HCS to be performed with great flexibility, with high throughput, and potentially at a fraction of the cost of current technologies. The electronic microfluidic cell chips can comprise numerous addressable micro-compartments for drug screening, cell biology and medicine.

Referring now to FIGS. 4a-4h, a plurality of microvalves may be positioned in series along a channel in order to pump or displace a fluid within the channel. For example, at least three (i.e. three or more) microvalves may be positioned in series along a channel to achieve a peristaltic pumping action. The three microvalves may be independent, such as such three microvalves 10 for example. Alternatively, two of the three microvalves may be coupled together. In this case, the three microvalves comprise one microvalve 10 and one microvalve system 50. In the depicted embodiment, two pairs (i.e. four valves total) of normally open valves are used as a pump 120, as illustrated in FIGS. 4a-4h.

The pump 120 comprises four microvalves 122-128 positioned in sequence along a channel 130 such that the microvalve 126 is located between the microvalves 122 and 124 and the microvalve 124 is located between the microvalves 126 and 128. The microvalves 122 and 124 are coupled together to form a first pair of hydraulically coupled valves, such as the valves 67 and 73 of the microvalve system 50, while the microvalves 126 and 128 form a second pair of hydraulically coupled valves. When the microvalves 122 and 126 are in an open position, the microvalves 124 and 128, respectively, are in a close position, and vice versa.

The pump 120 functions as follows. When the valve 122 is closed, the membrane of the associated or "paired" valve 124 is deflected up and pulls in the same volume of fluid in the flow channel 130 that is being displaced (pushed out) by the closure of the first valve 122, as illustrated in FIGS. 4a and 4b. When the valves 126 and 128 are respectively closed and opened, for example in a simultaneous manner, a volume of fluid is displaced by the closure of the valve 126 towards the valve 124 as illustrated in FIGS. 4c and 4d. When the valve 124 is closed, the membrane of the valve 122 is deflected up and a volume of fluid is deflected towards the valve 128 while a same volume of fluid enters the valve 122, as illustrated in FIGS. 4e and 4f. When the valve 128 is closed, a volume of fluid is output from the pump 120 while a same volume of fluid passes through the vale 126, as illustrated in FIGS. 4g and 4h. The fact that valves in each pair are hydraulically balanced ensures their synchronized action with equal but opposite volume displacements. As a consequence, activating the valves serially as shown in FIGS. 4a-4h results in a substantially unidirectional peristaltic pumping action.

Figure 19A:
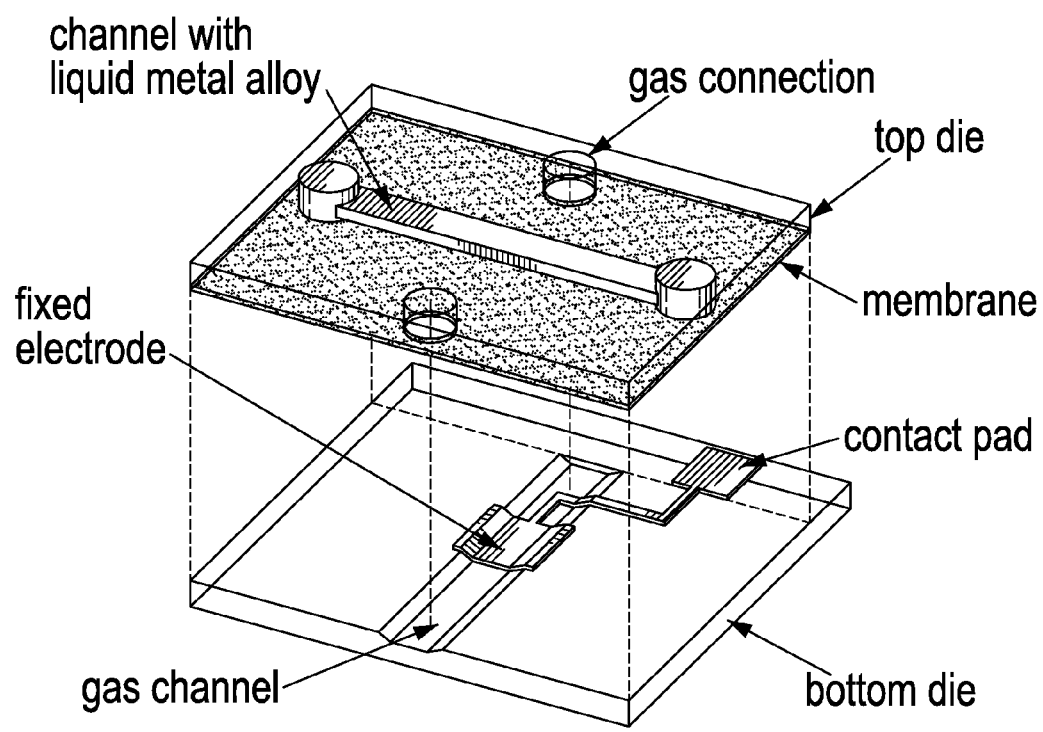
FIG. 19A shows an exploded perspective view of an embodiment of the microvalve.
Figure 19B:
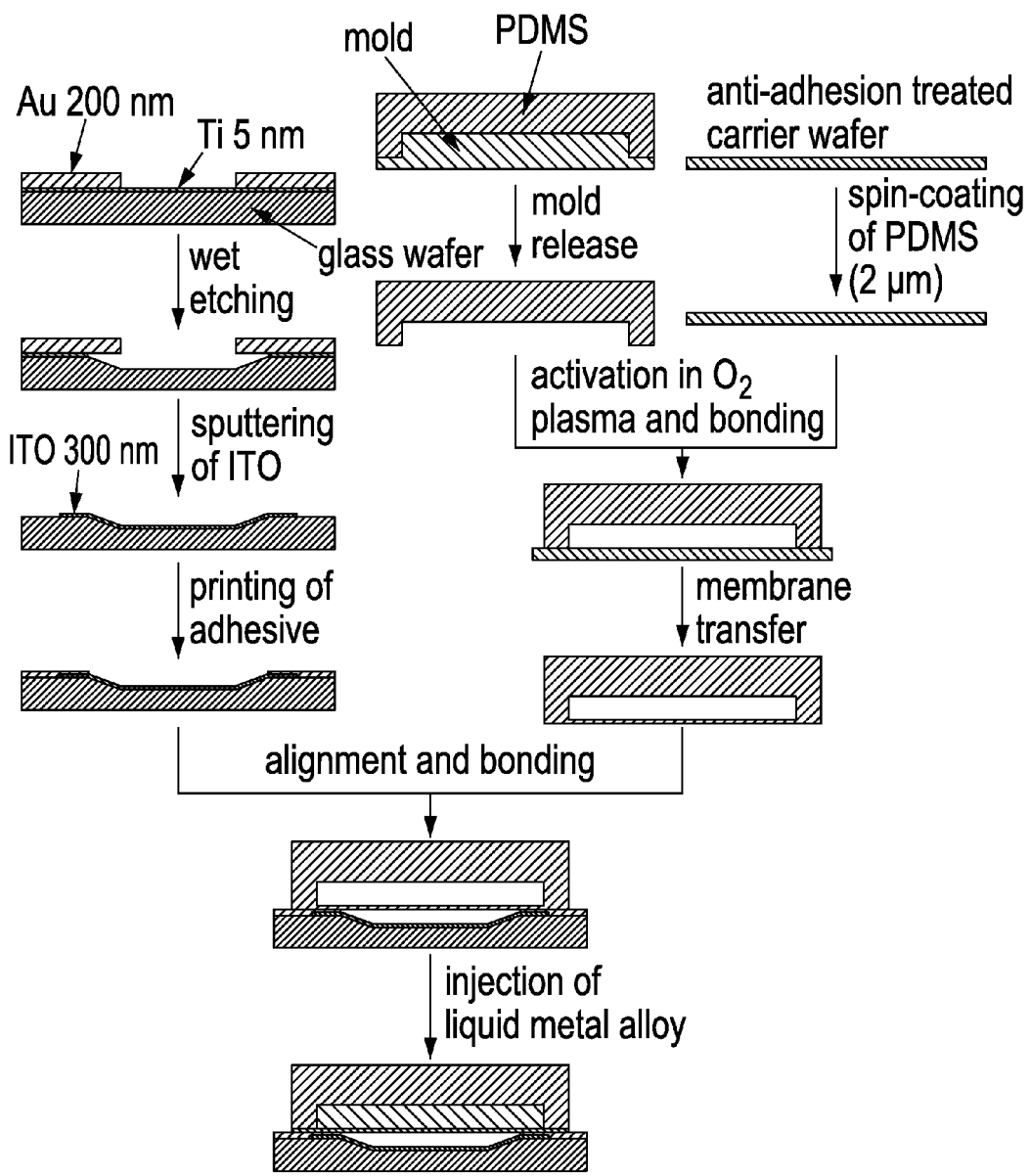
FIG. 19b illustrates a fabrication process for the microvalve in accordance with one embodiment.

Referring to FIGS. 19A-19B, one particular exemplary embodiment of the microvalve system and its fabrication process is depicted and will be briefly described. It is to be understood that the materials and characteristics provided are exemplary and correspond to this particular example, and that other materials and fabrication processes may be used.

The microvalve 310 is composed of two dies and a thin elastomeric membrane between them. The top die with channels for the electrically conductive liquid (such as a liquid metal alloy (LMA) for example), is made from PDMS. The membrane is about 2.0-µm thick and is fabricated from a 1:4 (w/w) mixture of PDMS and toluene by spin coating it onto a 150-mm silicon wafer at 3000 rpm for 60 s. In order to ease the subsequent release of the membrane, the wafer underwent anti-adhesion treatment in $CHF_3$ plasma before spin coating. The top die and the cured membrane were bonded together after a brief activation in oxygen plasma, and the assembly was gently peeled off from the carrier wafer. The bottom die is fabricated from a 100-mm borosilicate glass wafer. First, 15-µm deep channels of trapezoidal cross-section were wet etched in the glass wafer to form the fluid (in this case gas) channel in the bottom die, using the receding-mask wet etching method that is described in further detail below with reference to FIGS. 6-18.

The bottom portion of the channels so formed in the present example was approximately 200 µm wide with a sidewall angle of 14° from the horizontal plane, resulting in a total channel width of 320 µm at the top. Next, a lift-off process was used to pattern fixed electrodes in a sputter-deposited, 300-nm thick film of indium-tin oxide (ITO). Finally, the PDMS die was aligned and attached to the bottom die by adhesive bonding. The top die includes microchannels that cross over the ITO electrodes, and also gas access holes that are aligned with the ends of the channels in the bottom die. The LMA is injected into PDMS microchannels from a pre-filled teflon capillary connected to a plastic syringe. Electrical connections are established by inserting a short piece of Pt wire into the access holes of filled channels, and sealing the holes with silicone adhesive. Supplying nitrogen under pressure to the gas channel detaches the PDMS membrane and opens the channel to the flow. Conversely, when no pressure is applied, the membrane spontaneously adheres to the ITO and closes the channel. At potentials above 100 V between the LMA and ITO electrodes, the LMA exerts sufficient electrostatic pressure on the PDMS membrane which collapses and closes the valve against the applied gas pressure. The estimated displacement volume of this exemplary microvalve, based on the geometry of the gas channel, is approximately 0.8 nL. The valve of this embodiment was found to close in about 30 ms. The trapezoidal cross section of the gas channel ensures that the two electrodes are in close proximity along the edges of the gas channel, even when the valve is in an open state. Since the electrostatic force scales with the inverse square of the distance between the electrodes, a trapezoidal geometry has been found to lead to a "zipping" closure of the valve and thus allows the maximum channel depth of the present microvalve to be 2-3 times larger than typical gaps in known prior art parallel-plate configurations that operate at comparable dc voltages. When the voltage is disconnected, the valve opens in about 300 ms—comparably slower than closing because of the adhesion of PDMS to ITO. The opening speed in such membrane gas microvalves can be increased, if necessary, by surface treatment to reduce the adhesion of the membrane to the valve seat.

Although many different applications exist for the microvalve system described herein, in one particular embodiment the microvalve system 10, 50 is used in tactile displays.

Figure 5:
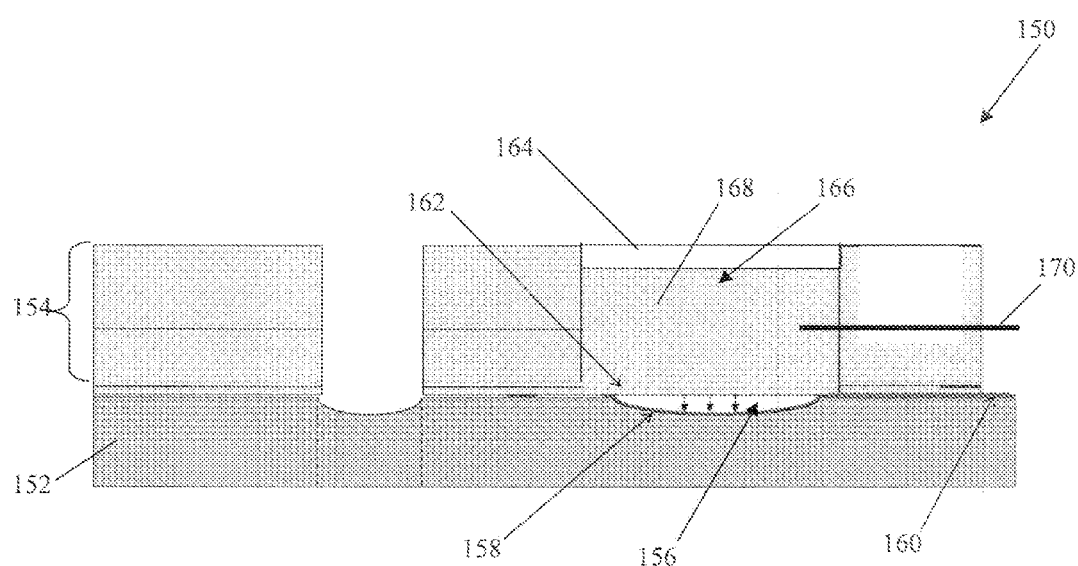
FIG. 5 is a schematic cross-sectional view of one embodiment of an adaptive mirror comprising a microvalve system.

In an alternate embodiment, the microvalve system 10 is used in an optical device. In this case, the displacement of the membrane 22 is used to deform optical elements, thereby altering the propagation of light in the optical device. FIG. 5 illustrates one embodiment of an adaptive mirror 150 comprising a microvalve system. The adaptive mirror 150 comprises a bottom substrate 152 and a top substrate 154. The bottom substrate 152 comprises a channel or cavity 156 in which an electrode 158 is disposed. The electrode 158 is connectable to a power source via an electrical contact 160. A first membrane 162 is disposed on top of the channel 156 which contains a fluid. The top substrate 154 comprises an opening which is closed at one end by a second membrane 164. When the top substrate 154 is disposed on top of the bottom substrate 152, the membrane 162 is aligned with the membrane 164 and the opening in the top substrate 154 to form a hermetically closed chamber 166 containing a substantially incompressible electrical conducting liquid 168. A second electrode 170 connects the liquid 168 to the power source. The liquid 168 acts as a hydraulic transmission medium for passively coupling the membranes 162 and 164 together such that a displacement of the first membrane 162 is accompanied with a displacement of the second membrane 164. Therefore, by applying an adequate voltage between the electrical contacts 160 and 170, the membrane 164 becomes curved and the curvature of the membrane 164 can be controlled by the applied voltage. While in FIG. 5 the membranes 162 and 164 are located on opposite sides of the substrate 154, it should be understood that other positions for the membranes 162 and 164 are possible. For example, the chamber 166 may be provided with an opening on a lateral face and the membrane 164 can be positioned to over this lateral opening to hermetically close the chamber.

In one embodiment, the electrically conducting liquid 168 is a light reflecting liquid such as an LMA for example, and the membrane 164 is substantially transparent. Light incident on the membrane 164 is thus transmitted through the transparent membrane 164 to the liquid 168, which reflects light. By varying the applied voltage, thereby varying the curvature of the membrane 164, it is possible to vary the angle of reflection of the incident light.

In another embodiment, any incompressible electrically conducting liquid 168 can be used and the membrane 164 is provided with a film of light reflecting material on its top face. The film of light reflecting material is substantially flexible to allow the membrane 164 to curve and can be made of material such as Al, Au, Ag, and the like.

It should be understood that the bottom substrate 12, 52, 152 and the top substrate 14, 54, 154 can be parts of a unitary body, thereby forming different portions of a single body. Alternatively, the bottom substrate 12, 52, 152 and the top substrate 14, 54, 154 can be fabricated in two separate pieces and subsequently secured together.

It should also be understood that the cavities 24, 70 and 72 may have any adequate shape and dimensions as long as they allows the electrical conducting liquid 28, 75 to be in contact with at least a portion of the membrane 22, 66, 68.

It should be understood that the channels 16, 24, 56, 58, 60, 70, and 72 can have any adequate shape and dimensions. While FIG. 1 illustrates a curved cavity 16, the cross-section of the cavity can be rounded, rectangular or square, for example. The membranes 22, 66, and 68 may have any adequate shape and size adapted to their respective channel to regulate the flow of the fluid. The surface area of the membrane 22, 66, 68 is chosen to amplify or reduce the actuation force and displacement, as needed. For example, by providing the second membrane 68 with a smaller surface area than that of the first membrane 66, an amplification of the actuation force and displacement of the second membrane can be achieved.

The following describes methods of etching a substrate in order to create a channel for example, such as channels 16, 24, 56, 58, 60, 70, and 72. In accordance with a broad aspect, there is provided a method for etching a substrate comprising: providing a chip comprising a substrate, a sacrificial layer, and a patterning layer respectively superimposed one on top of another, the sacrificial layer and the patterning layer forming a bilayer mask having an opening at least through the patterning layer, the patterning layer being resistant to a substrate etchant; and concurrently etching the substrate and the sacrificial layer through the opening to create a cavity having inclined sidewalls in the substrate, an inclination angle of the inclined sidewalls being determined by a first etching rate of the sacrificial layer and a second etching rate of the substrate by the substrate etchant.

In accordance with another broad aspect, there is provided a method for etching a cavity having inclined sidewalls in a substrate, comprising: determining a substrate etchant, a sacrificial material and a patterning material adapted to a material of the substrate, the material of the substrate being etchable by the substrate etchant and the patterning material being substantially resistant to the substrate etchant; determining a thickness for a sacrificial layer in accordance with at least an inclination angle for the inclined sidewalls and a reaction rate for the material of the substrate with the substrate etchant; providing a chip comprising the substrate, the sacrificial layer made of the sacrificial material and having the thickness, and a patterning layer made of the patterning material respectively one on top of another, the sacrificial layer and the patterning layer forming a bilayer mask superimposed on the substrate and having an opening at least through the patterning layer; and concurrently etching the substrate and the sacrificial layer through the opening to create the cavity having the inclined sidewalls in the substrate.

In the following, the term "cavity" refers to any structure in a substrate. For example, an opening, a recess, a channel, and the like are examples of such a cavity. The cavity can have any shape and dimensions adapted to and suitable for the microfabrication field. For example, a cavity may be circular, rectangular, square, etc.

Microfabrication comprises a collection of technologies which are utilized in making microdevices. To fabricate a microdevice (i.e. a miniature structure, for example of millimeter sizes and smaller), many processes must be performed, one after the other, many times repeatedly. These processes typically include depositing a film, patterning the film with the desired micro features, and removing (or etching) portions of the film.

Microfabricated devices are not generally freestanding devices but are usually formed over or in a thicker support substrate. For electronic applications, semiconducting substrates such as silicon wafers can be used. For optical devices or flat panel displays, transparent substrates such as glass or quartz are common. The substrate enables easy handling of the microdevice through the many fabrication steps.

Etching is the removal of some portion of the thin film or substrate in order to create a cavity or structure therein. The substrate is thus exposed to an etchant which chemically or physically attacks the film or substrate until it is partly or fully removed. When etching a cavity in a substrate while using commonly known wet etching techniques, the inclination of the sidewalls of the etched cavity is fixed and imposed by the nature of the material. For amorphous materials, the sidewalls of the cavity are rounded with a substantially 45 degree inclination angle. For crystalline materials, the inclination angle of the sidewalls is imposed by the crystalline structure of the material. For example, when etching a cavity in an oriented crystalline silicon structure, the inclination angle of the sidewalls of the etched cavity is about 54.7 degrees.

Figure 6:
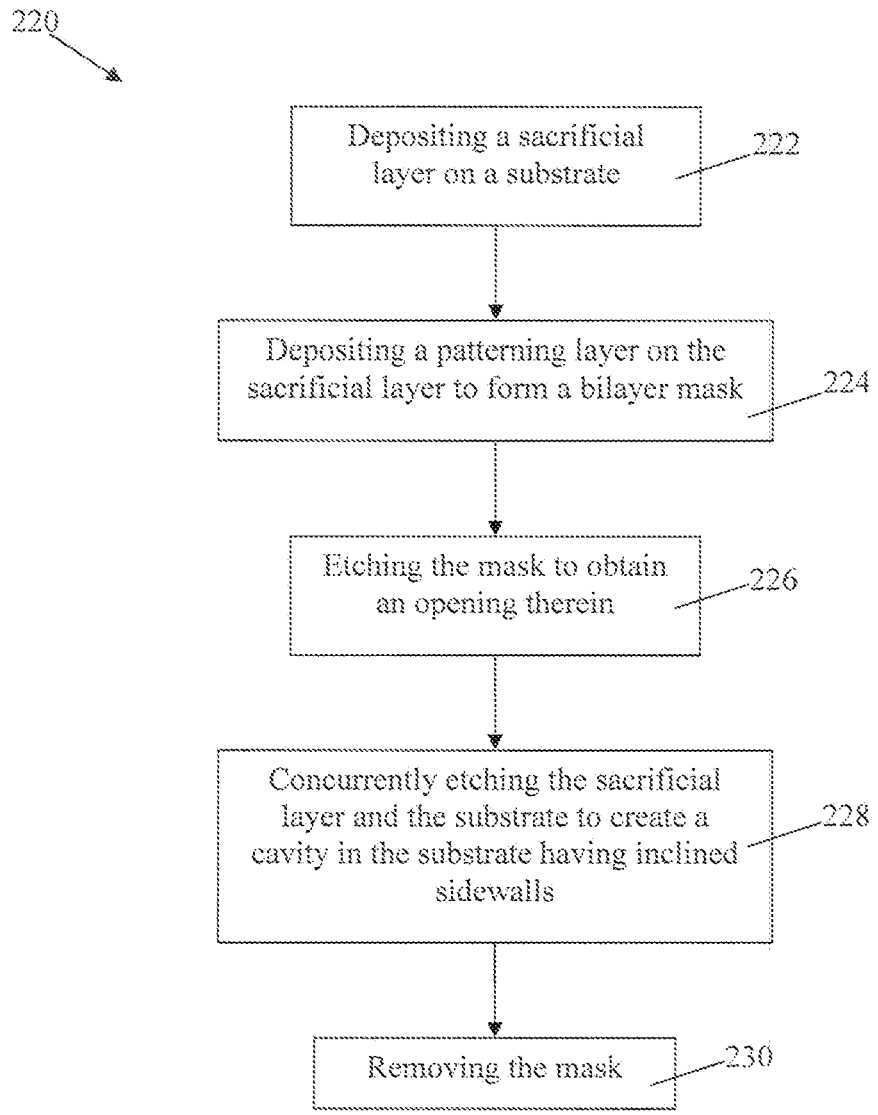
FIG. 6 is a flow chart of an embodiment of the present method for fabricating an etched structure in a substrate using a bilayer mask.
Figure 7:
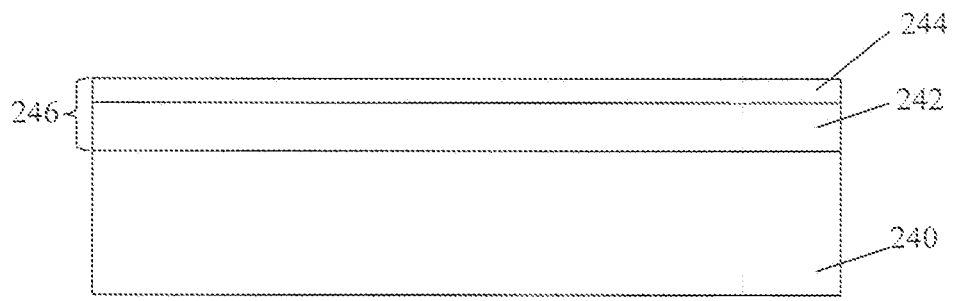
FIG. 7 is a schematic illustration of a bilayer mask deposited on top of a substrate.

FIG. 6 illustrates one embodiment of the present method 220 for fabricating, by wet etching, a structure or cavity in a substrate 240, as shown in FIG. 7. The first step 222 comprises depositing a sacrificial layer 242 on top of a substrate 240, as illustrated in FIG. 7. The substrate material and the sacrificial layer material share a common etchant so that both the sacrificial layer and the substrate can be etched using a single etchant, i.e. the common etchant. In one embodiment, the common etchant comprises a single chemical element or a single chemical compound. Alternatively, the common etchant can be a mixture of different chemical components such as a mixture of chemical elements, a mixture of chemical compounds, a mixture of chemical elements and chemical compounds, and the like. In this case, at least one of the chemical components of the common etchant is adapted to etch the substrate material while at least another one of the chemical components of the common etchant is adapted to etch the sacrificial layer material. The second step 224 comprises depositing a patterning layer 244 on top of the sacrificial layer 242 so that the sacrificial layer 242 is sandwiched between the substrate 240 and the patterning layer 244 in order to obtain a three layer chip. The material of the patterning layer 244 is chosen to be chemically inert when in presence of the common etchant in order to be substantially resistant to the common etchant. The sacrificial layer 242 and the patterning layer 244 form a bilayer mask 246 used to fabricate the etched structure in the substrate. The next step 226 of the method 220 is the patterning of the bilayer mask 246. The patterning step 226 comprises etching at least one opening in the bilayer mask 246 in accordance with a predetermined pattern. The predetermined pattern is determined in accordance with the structure to be etched in the substrate 240. It should be understood that any method known to a person skilled in the art for determining a mask pattern in accordance with a desired substrate structure can be used.

Figure 8A:
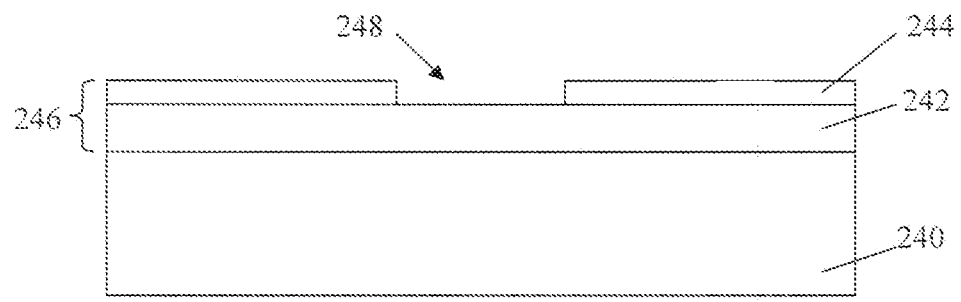
FIG. 8A illustrates the bilayer mask of FIG. 3 provided with an opening extending through a patterning layer of the bilayer mask.

In one embodiment, step 226 comprises etching an opening 248 only in the patterning layer 244 of the bilayer mask 246, as illustrated in FIG. 8A. In this case, a patterning etchant adapted to only etch the patterning layer 244 may be used and the sacrificial layer material is substantially resistant to the etchant. Alternatively, the sacrificial layer material may not be resistant to the patterning etchant but the process of etching the patterning layer 244 is stopped when the patterning etchant reaches the sacrificial layer 242 so that the sacrificial layer 242 is substantially not attacked by the etchant.

Figure 8B:
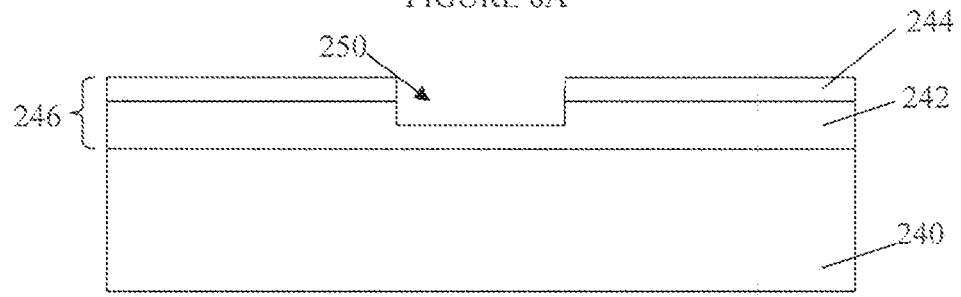
FIG. 8B illustrates the bilayer mask of FIG. 3 provided with an opening extending through a patterning layer and partially through a sacrificial layer of the bilayer mask.

In another embodiment, the step 226 comprises etching an opening 250 in the bilayer mask 246, as illustrated in FIG. 8B. The opening 50 penetrates entirely through the patterning layer 244 and only partially through the sacrificial layer 242. In this case, the patterning etchant used for etching the opening 250 is adapted to etch both the sacrificial layer 242 and the patterning layer 244.

Figure 8C:
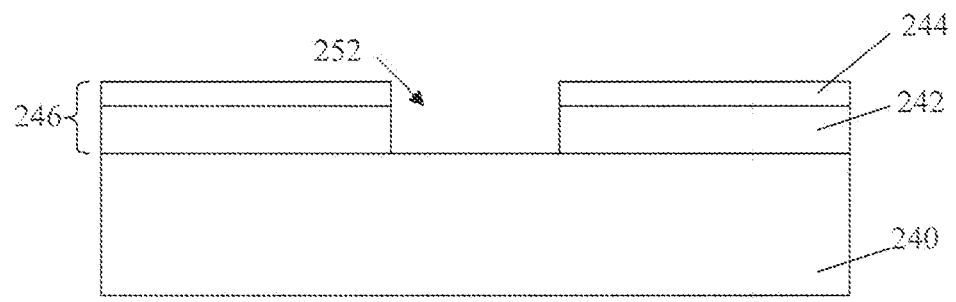
FIG. 8C illustrates the bilayer mask of FIG. 3 provided with an opening extending through a patterning layer and a sacrificial layer of the bilayer mask.

In a further embodiment, the step 226 comprises creating the opening 252 in the bilayer mask 246, as illustrated in FIG. 8C. The opening 52 penetrates entirely through the patterning layer 244 and the sacrificial layer 242 down to the substrate 240. The patterning etchant used for etching the opening 252 is adapted to etch the materials of the sacrificial and patterning layers 242 and 244 while the material of the substrate 240 is substantially resistant to the patterning etchant. Alternatively, the material of the substrate 242 may be attacked by the patterning etchant but the etching step 226 is stopped when the patterning etchant reaches the substrate 240.

In one embodiment, before etching the patterning layer 244, a photoresist is deposited on the sacrificial layer and the patterning layer 244 is patterned using photolithography. Exposed areas of the patterning layer 244 are then etched.

Referring back to FIG. 6, once the opening has been etched in the mask, the next step 228 is the etching of the cavity in the substrate 240. The etching of the structure is performed by concurrently etching the substrate 240 and the sacrificial layer 242 of the bilayer mask 246 using the common etchant. The common etchant is applied on the substrate 240 and the sacrificial layer 242 through the opening previously formed in the bilayer mask. Since the material of the patterning layer is substantially resistant to the common etchant, the patterning layer 244 is substantially not attacked by the common etchant.

For example, the common etchant may be applied through the opening 248 or 250 illustrated in FIGS. 8A and 4B, respectively. In this case, the common etchant first dissolves the sacrificial layer 242 before reaching the substrate 240. As soon as the common etchant reaches the substrate 240, both the substrate 240 and the sacrificial layer 242 are concurrently attacked and dissolved by the common etchant. In another embodiment, the common etchant is applied through the opening 252 illustrated in FIG. 8C. In this case, the sacrificial layer 242 and the substrate 240 are concurrently attacked and dissolved as soon as the common etchant is introduced into the opening 252.

Figure 9:
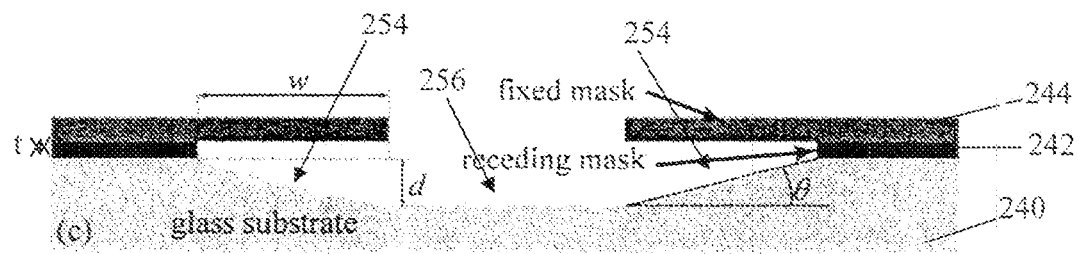
FIG. 9 is a schematic illustration of a substrate comprising a cavity having controlled inclined sidewalls produced in accordance with an embodiment of the present method.

As seen in FIG. 9, during the concurrent etching of the substrate 240 and the sacrificial layer 242 by the common etchant, the substrate is vertically and laterally etched to create a cavity 256 while the sacrificial layer 242 is laterally etched. Since the sacrificial layer 242 chemically reacts with the common etchant, and the patterning layer 42 is resistant to the common etchant, the sacrificial layer 42 and the patterning layer 240 may be considered as a receding mask and a fixed mask, respectively. The etching of the sacrificial layer 242 results in a lateral recession w of the sacrificial layer 242 while the etching of the substrate 240 results in an etching depth d in the uncovered substrate. Because of the lateral recession w of the sacrificial layer 242, which acts as a laterally receding mask, it is possible to control the inclination angle θ of the sidewalls of the cavity 256 in the substrate 240. This inclination angle θ can be defined as a function of the etching ratio w/d in accordance with the following equation:

$$\theta = \cot^{-1}(w/d) \text{ with } \theta \leq \theta_{max},$$

where $\theta_{max}$ is defined as the uncontrolled inclination angle θ when no sacrificial layer is used in accordance with the prior art.

The inclination angle θ increases with the etching depth d of the cavity 256 in the substrate 240 and decreases with the lateral recession w of the sacrificial layer 242. As the etching depth d and the lateral recession w are substantially equal to the etching time multiplied by the substrate etching rate and the sacrificial layer etching rate, respectively, the inclination angle θ is a function of the etching rate of the substrate 240 and the etching rate of the sacrificial layer 242. Increasing the etching rate of the substrate 240 results in increasing the inclination angle θ, and increasing the etching rate of the sacrificial layer 242 results in decreasing the inclination angle θ.

The etching rate of the sacrificial layer 242 depends on the thickness t of the sacrificial layer 242 and the speed or rate of the chemical reaction between the common etchant and the material of the sacrificial layer 242, and therefore depends on the thickness t, the sacrificial layer material and the common etchant. For example, a sacrificial layer having a greater transverse thickness t will recede at a greater rate then a thinner layer due to the increase surface area in contact with the etchant, with all other variables being the same. The etching rate of the substrate 240 depends on the speed or rate of the chemical reaction between the common etchant and the material of the substrate 240, and therefore depends on the substrate material and the common etchant. As a result, the inclination angle θ depends on the substrate material, the sacrificial layer material, the common etchant, and the thickness t of the sacrificial layer 42.

In one embodiment, the materials of the sacrificial layer 242 and the substrate 240, and the etchant are selected so that the reaction rates of the etchant with the sacrificial layer material and the substrate are fixed. In this case, the inclination angle θ of the cavity sidewalls 254 may be formed at a desired value by providing the sacrificial layer 242 with an appropriate thickness t. Increasing the thickness of the sacrificial layer increases the etching rate of the sacrificial layer 242, increases the lateral recession of the sacrificial layer and decreases the inclination angle θ.

In another embodiment, the thickness of the sacrificial layer 242, the material of the substrate 240, and the common etchant are selected. In this case, the desired inclination angle θ is determined by the material of the sacrificial layer. By choosing, for the sacrificial layer, a material having an appropriate rate of chemical reaction with the common etchant, a desired inclination angle θ can be achieved.

In a further embodiment, the thickness of the sacrificial layer 242 and the materials of the substrate 240 and the sacrificial layer 242 are selected. A desired value for the inclination angle θ can be achieved by choosing a particular common etchant having appropriate chemical reaction rates with the material of the substrate 240 and the material of the sacrificial layer 242.

While FIG. 9 shows one embodiment of sacrificial layer having an etching rate greater than that of the substrate, it should be understood that the etching rate of the sacrificial layer may alternately be substantially equal to or less than the etching rate of the substrate. In this case, it is possible to obtain a slightly stretched profile in comparison to the profile obtained in the absence of a receding sacrificial layer.

Referring back to FIG. 6, the last step 230 of the method 220 comprises removing the bilayer mask 246. The removal of the bilayer mask 246 is achieved by etching the patterning layer 244 and the sacrificial layer 242. A single removing etchant adapted to both the material of the patterning layer 244 and the material of the sacrificial layer 242 can be used. Alternatively, two removing etchants, each adapted to a corresponding one of the material of the patterning layer 244 and the material of the sacrificial layer 242 can be used.

In one embodiment, an electrical bias is applied to the sacrificial layer 242 during the concurrent etching of the sacrificial layer 242 and the substrate 240. The electrical bias is used for influencing the electrochemical process that occurs between the sacrificial layer material and the common etchant. For example, if the sacrificial layer 242 is oxidized by the common etchant, electrically biasing the sacrificial layer reduces the oxidation rate of the sacrificial layer 242. As a result, when the sacrificial layer 242 is electrically biased, the recession rate of the sacrificial layer 242 is less and the inclination angle θ of the sidewalls 254 is higher with respect to the recession rate and the inclination angle θ when no electrical bias is applied to the sacrificial layer 242. Therefore, a predetermined inclination angle of the channel walls formed can be obtained by applying an adequate electrical bias to the sacrificial layer 242. The electrical bias to be applied to the sacrificial layer is determined in accordance with the thickness of the sacrificial layer 242 and the desired inclination angle for the sidewalls.

Figure 10:
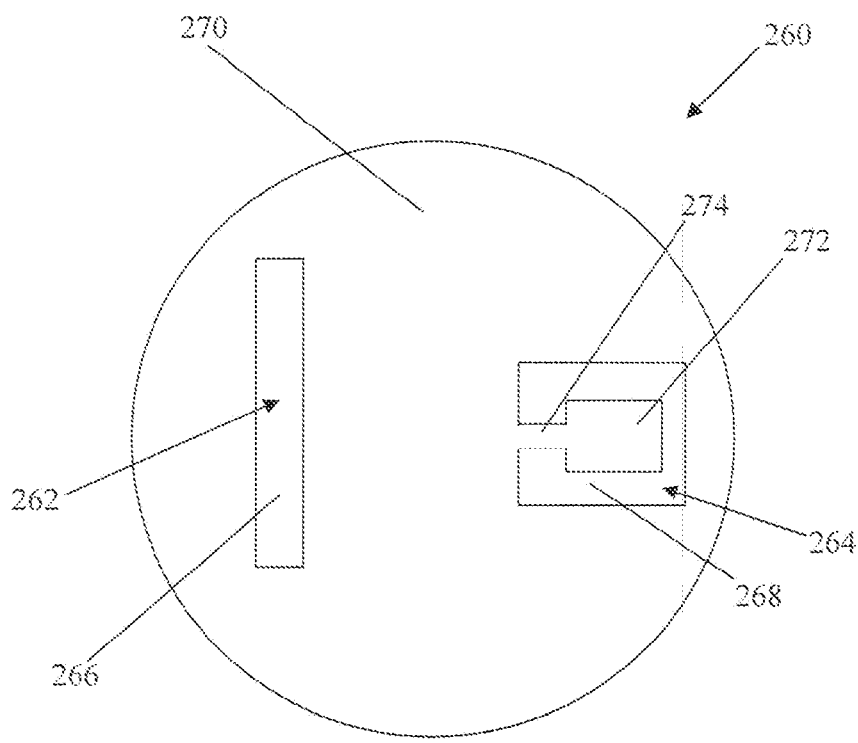
FIG. 10 is a top view of a substrate wafer covered by a patterned bilayer mask.

FIG. 10 is a top view of one embodiment of a substrate wafer 260 in which different electrical biases are applied to different sections of a sacrificial layer. The wafer 260 comprises a substrate covered by a bilayer mask. The bilayer mask comprises a sacrificial layer and a patterning layer. Openings 262 and 264 are present in the bilayer mask so that areas 266 and 268 of the substrate are not covered by the bilayer mask. The openings 262 and 264 divide the bilayer mask into two sections 270 and 272 which are connected together by a bridge 274. The bridge 274 also electrically connects the sections 270 and 272 of the sacrificial layer of the bilayer mask. A resistance value is associated with the bridge 274 and this resistance value may be set to a desired value by adjusting the size, shape, and/or material of the bridge 274. An electrical bias is applied to the sacrificial layer of the bilayer mask section 270 by electrically connecting the sacrificial layer comprised in the section 270 to a power source and by electrically connecting the power source to the etchant used for etching the sections 266 and 268 of the substrate. By adjusting the resistance of the bridge 274 to a predetermined value, the section 270 of the sacrificial layer is biased to a first value while the section 272 of the sacrificial layer is biased to a second and different value. As a result, the inclination angle of the sidewalls of the cavity etched in the section 266 of the substrate will be different from the inclination angle of the sidewalls of the cavity etched in the section 268 of the substrate.

In one embodiment, the sections 270 and 272 of the bilayer mask are not electrically connected together, but electrically isolated one from the other. In this case, the sections 270 and 272 can be electrically biased to different values using different power sources.

Figure 11:
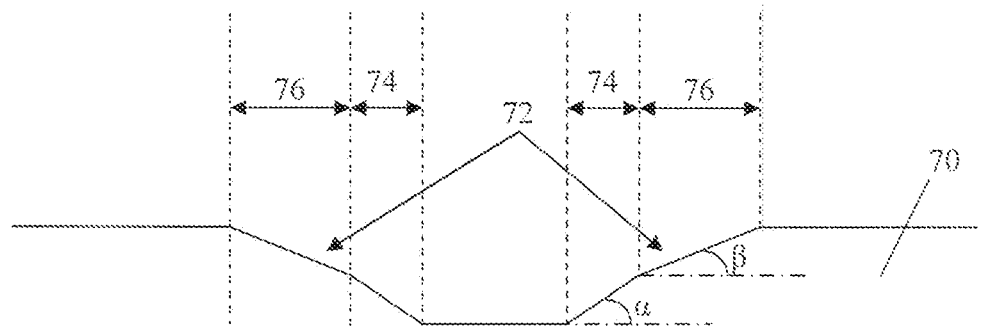
FIG. 11 is a cross-sectional view of a substrate comprising a cavity produced in accordance with another embodiment of the present method, the cavity having inclined sidewalls with a varying inclination angle.

In one embodiment, the inclination angle θ of the channel sidewalls 254 is varied in time during the etching process by varying, in time, the electrical bias applied to the sacrificial layer. This results in a cavity having sidewalls of which the slope is not constant and thus has a varying inclination angle as illustrated in FIG. 11. The substrate 270 comprises a cavity having sidewalls 272. Each sidewall 272 comprises two sections, namely section 274 and section 276. The sections 274 are each associated with an inclination angle α while the sections 276 are each associated with a different inclination angle β. In order to achieve the particular sidewalls 272, a first electrical bias is applied to the sacrificial layer of the bilayer mask used for etching the cavity. The substrate 270 is etched concurrently with the sacrificial layer until the lateral recession w of the bilayer mask reaches a first predetermined value. Once this first lateral recession predetermined value is reached, the electrical bias applied of the sacrificial layer is changed to a second predetermined bias value and the substrate is etched concurrently with the sacrificial layer until the lateral recession w of the sacrificial layer reaches a second predetermined value. While predetermined lateral recessions w of the sacrificial layer are used for determining the points in time for changing the applied electrical bias, it should be understood that predetermined etching times can also be used. For example, during the concurrent etching of the substrate and the sacrificial layer, the electrical bias can be varied from the first bias value to the second bias value after a first predetermined etching time. The etching process is subsequently stopped after a second etching time.

While in step 228 of the method 220 illustrated in FIG. 6, the substrate 240 and the sacrificial layer 242 are concurrently etched using the same etching technique, i.e. wet-etching using the common etchant, it should be understood that different etching techniques can be used for concurrently etching the substrate 240 and the sacrificial layer 242. For example, the sacrificial layer material can be substantially resistant to the etchant used for etching the substrate 240 so that the sacrificial layer 242 is substantially not attacked by the common etchant. Electrochemical etching can be used for etching the sacrificial layer 242 concurrently with the wet-etching of the substrate 240. In this case, an anodic (positive) bias is applied to the sacrificial layer 242 to precisely control its lateral dissolution (recession) during the wet-etching of the substrate 240. For example, the substrate 240, the sacrificial layer 242, and the patterning layer 244 can be respectively made from glass, chromium, and gold, and a HF-based glass etchant is used for etching the glass substrate. As chromium is substantially resistant to the HF-based glass etchant, the chromium sacrificial layer is etched by electrochemical etching. An electrical bias adapted to anodically dissolve chromium at a desired dissolution rate is applied to the chromium sacrificial layer during the etching of the glass substrate by the HF-based etchant so that both the etching of the glass substrate and the etching of the chromium sacrificial layer are concurrently performed. The gold patterning layer is substantially resistant to the two etching processes so that it is substantially not attacked.

The following is an example of the fabrication of a cavity as described above in a glass substrate. A borosilicate glass wafer is first cleaned in a piranha solution. Then, a titanium film is sputtered on the glass wafer and a gold film is sputtered on the titanium film in order to form a bilayer mask on top of the glass substrate. It should be understood that any sputtering methods known to a person skilled in the art can be used. The gold layer of the wafer is then spin-coated with of a positive photoresist, such as 1.4 µm of Shipley 1813 photoresist for example.

After depositing the photoresist on the bilayer mask, the photoresist layer is photolithographically patterned using any standard procedures. The patterning of the photoresist layer results in exposed areas of the photoresist that are then etched away using any adequate etchant, such as TFA gold etchant for example. The wafer is then rinsed and dried. The removal of remaining titanium may not be necessary at this point, as the common etchant applied in subsequent steps rapidly dissolves any titanium that is directly exposed to the solution. The photoresist layer may for example be made of gold, or another suitable material.

In one embodiment, the next step comprises removing the photoresist layer remaining on top of the unetched areas of the gold layer. Alternatively, the remaining photoresist may be left on top of the unetched areas of the gold layer. Leaving the photoresist on top of etch mask may improve the etch quality by preventing creation of pinhole defects.

The last step comprises concurrently etching the glass substrate and the titanium sacrificial layer using a glass etching solution. Any glass etchant adapted for etching both glass and titanium while being substantially inactive or inert with gold may be used. For example, an etching solution prepared by mixing a 6:1 buffered oxide etch solution with 30% hydrochloric acid (HCl) at a 4:1 ratio by volume can be used. The addition of HCl results in a smoother surface of etched features. Titanium and glass chemically react with this etching solution while gold is substantially resistant to the etching solution. As a result, the glass substrate and the titanium sacrificial layer are etched by the etching solution while the patterning gold layer is substantially unattacked by the etching solution.

In one embodiment, the wafer is placed in a polypropylene beaker containing the etching solution, and the beaker is placed in an ultrasonic bath. The temperature of the bath is set to about 35° C., the ultrasound power is adjusted to the 20% setting, and the etching time is about 24 minutes.

Figure 12:
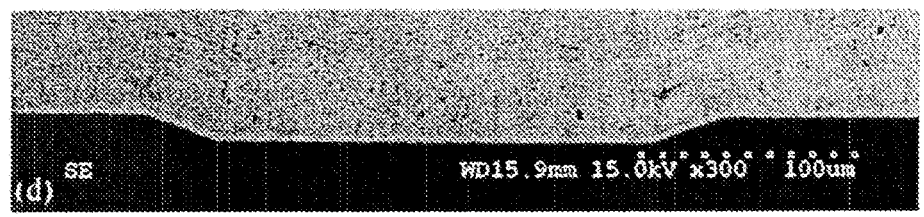
FIG. 12 is a photograph illustrating a controlled inclined sidewall cavity fabricated in a glass substrate produced in accordance with an embodiment of the present method.

Following the glass etching step, the photoresist layer is removed with acetone, and gold is etched away. Finally, the remaining titanium is removed by immersing the wafer for several seconds in the glass etching solution. FIG. 12 illustrates the cross-section of a channel in the borosilicate glass substrate resulting from the above presented etching method. The channel so formed and illustrated in FIG. 12 has planar sidewalls with an inclination angle less than 45 degrees. This significantly differs from the rounded sidewalls of having an inclination angle of about 45 degrees when etched using prior art etching methods.

Figure 13:
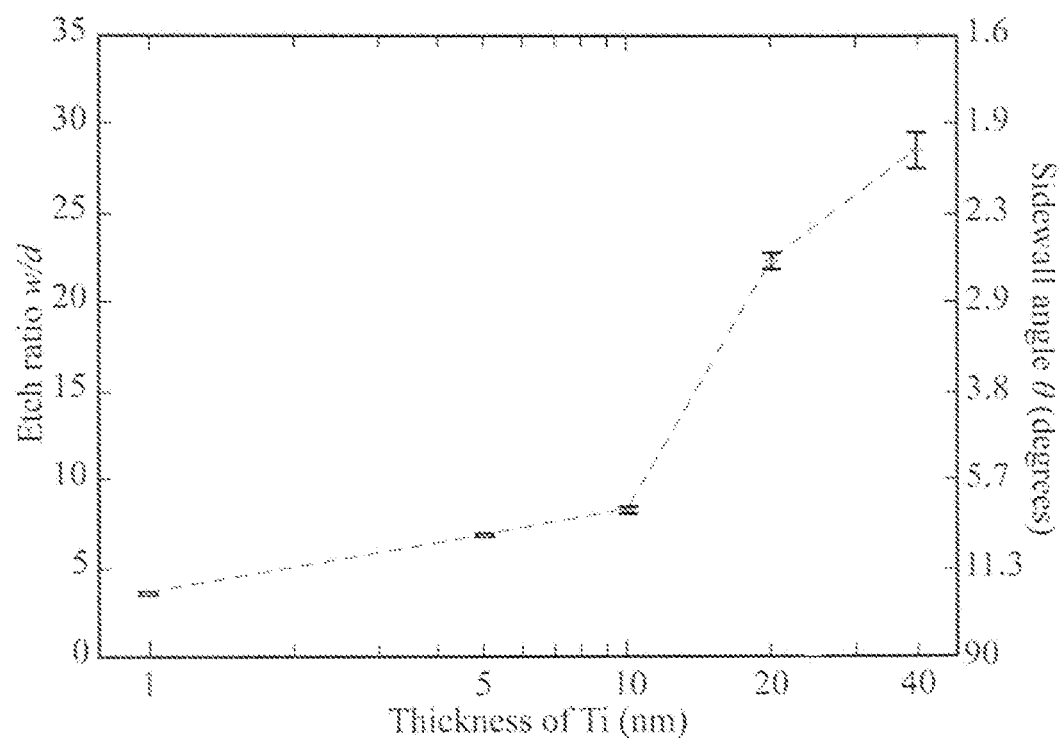
FIG. 13 is a graph illustrating an inclination angle as a function of a sacrificial layer thickness.

FIG. 14 is a graph presenting the etching ratio w/d and the inclination angle θ for different thickness values for the titanium layer. The titanium layer is deposited on a glass substrate and a 200 nm gold layer is deposited on top of the titanium layer. The titanium layer thickness is varied from 1 nm to 5, 10, 20 and 40 nm. As illustrated in FIG. 13, increasing the thickness of the receding titanium mask layer results in an increase of etching ratio w/d and a decrease of the inclination angle θ. The etching depth d of the unmasked region of the glass substrate remains substantially constant and substantially equal to about 4.8 µm which corresponds to an etching rate of glass of about 0.2 µm/min.

Since the etching rate of titanium in HF is faster than that of borosilicate glass, this implies that progressive dissolution of exposed edges of titanium results in a gap between the gold overhang and the glass. Within this crevice, the etching rates of both titanium and glass are affected by the efficiency of the mass transfer of species involved in the respective chemical reactions. A thicker titanium layer defines a wider crevice and a more efficient mass transfer to and from the bulk solution, leading to faster progression of the titanium etching front and gentler sidewall angles.

Figure 14A:
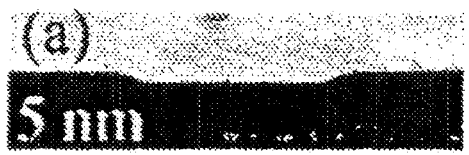
FIGS. 14A-14D are photographs of four substrates comprising a cavity fabricated using four different thicknesses for a sacrificial layer.
Figure 14B:
Figure 14C:
Figure 14D:
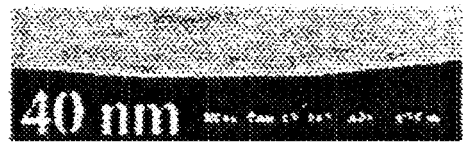

FIGS. 14A-14D show the resulting etched channels when the etching process is performed with a 5, 10, 20 and 40 nm titanium layer, respectively. Photographs shown in FIGS. 14A-14D have been vertically stretched by a factor of 2.5 to increase the aspect ration. In FIG. 14A, the inclination angle θ of the channel sidewalls is about 9 degrees while the inclination angle of the sidewalls of the channel illustrated in FIG. 14B is about 7 degrees. In FIG. 14C, the inclination angle θ of the channel sidewalls is about 2.5 degrees while the inclination angle of the channel sidewalls illustrated in FIG. 14D is about 2 degrees.

In one embodiment, an electrical bias is applied to the titanium sacrificial layer during the concurrent etching of the substrate and the titanium sacrificial layer. In this case, the electrical bias is applied using a voltage source. Since gold and titanium are electrical conductors, one electrode is connected to the gold layer in order to apply the bias to both the gold layer and the titanium layer. Photoresist is wiped off using acetone-soaked tissue from a small area near the edge of a die, where the negative output of the voltage source is connected using a copper clip. The die is then partly immersed in the etchant so that the electrical connection remains above the level of the solution in the beaker. Positive end of the voltage source is connected to a platinum wire that served as a counter electrode positioned in the solution adjacent to the die.

Figure 15:
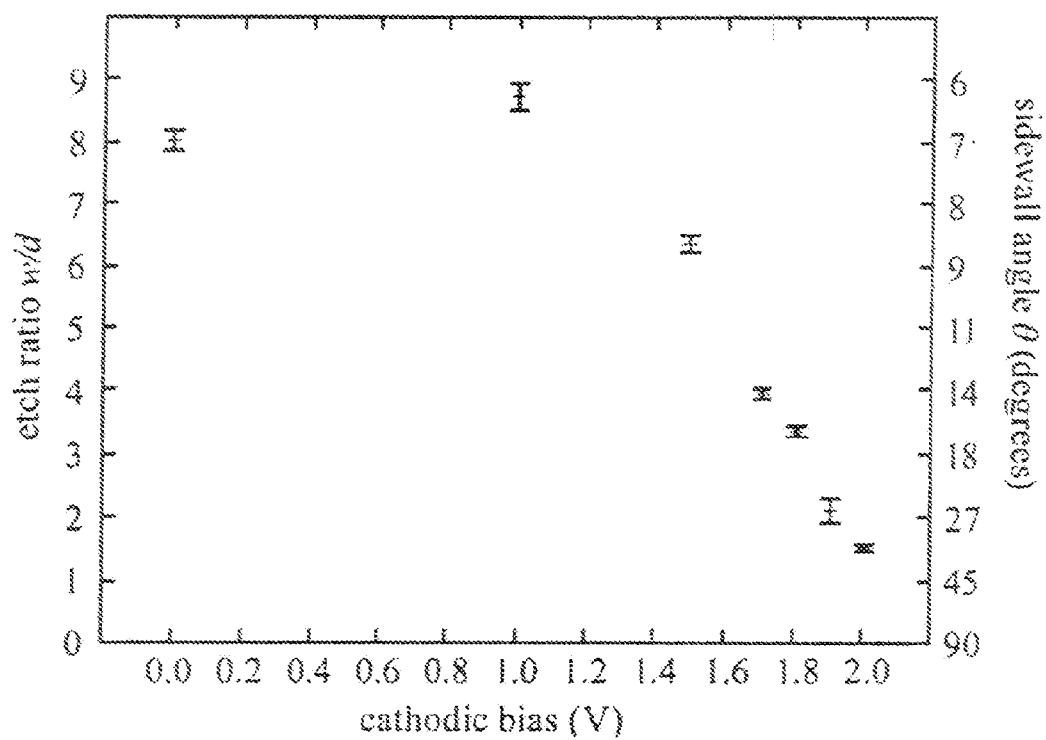
FIG. 15 is a graph illustrating an inclination angle as a function of an electrical bias applied to a sacrificial layer.
Figure 16:
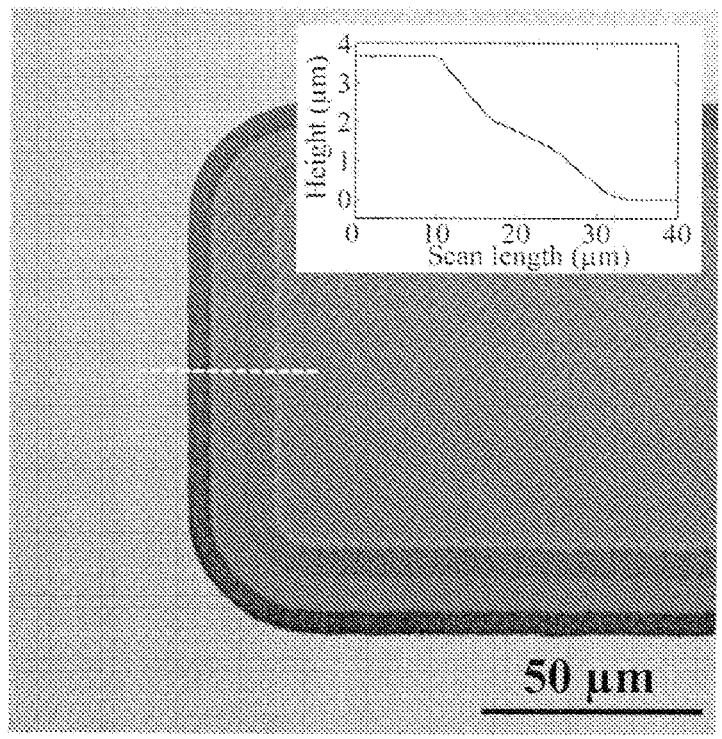
FIG. 16 shows a photograph of a cavity etched in a glass substrate and a graph illustrating the slope of the cavity sidewall when an electrical bias is applied to the sacrificial layer during the concurrent etching of the substrate and the sacrificial layer.

Dissolution of titanium by HF and HCl is a complex electrochemical process whereby, in solutions exposed to air, titanium metal is ultimately oxidized to its four-valent state. This feature allows the control of the recession of the sacrificial layer by imposing an electrical bias on the bilayer mask. FIG. 15 illustrates a graph of the etching ratio w/d and the inclination angle θ as a function of the electrical bias applied to the sacrificial titanium layer. At a potential of −1.0 V, the etching ratio substantially remains similar to that observed in a non-biased system. Decreasing the potential results in increasing the electrical bias, decreasing the etching ratio w/d, and increasing the inclination angle towards the fixed mask inclination angle $\theta_{max}$. FIG. 16 shows a photograph of the resulting cavity etched in the glass substrate and a profile of a sidewall of the cavity when the electrical bias is applied to the sacrificial layer during the concurrent etching of the substrate and the sacrificial layer.

In one embodiment, applying a negative bias to the titanium layer allows the available range of sidewall inclination angles to be extended towards steeper values by slowing down the chemical reaction rate below the practical limits of the thickness-control method.

In one embodiment, a slight evolution of bubbles is noticeable on the Pt electrode and along the edges of the mask below −1.8 V, however quality of etched features as evaluated by optical microscopy was not substantially affected.

In one embodiment, the patterning of the bilayer mask can incorporate features that are electrically isolated from the biased portion of the bilayer mask. In such cases, local etch ratios equivalent to those for an unbiased mask are observed in the electrically isolated regions.

In one embodiment, the substrate 240 is made of silicon, the sacrificial layer 242 is made of aluminum, and the patterning layer is made of gold, palladium, nickel, platinum, or silicon nitride. The common etchant used for concurrently etching the silicon substrate and the aluminum sacrificial layer comprises potassium hydroxide or any alkaline etchant used to etch silicon.

In a further embodiment, the substrate 240 is made of a plastic material such as polyimide, the sacrificial layer is made of photoresist, and the patterning layer is made of metal having with adequate adhesion to photoresist, such as Cr, Al, Ni, Ti, and the like. Alternatively, the patterning layer can be a bilayer comprising two metallic layers, such as Cr/Au bilayer, Ti/Au bilayer, and the like. The common etchant used for concurrently etching the plastic substrate and the photoresist sacrificial layer comprises a mixture of N-methyl pyrrolidone and 2-(2-aminoethoxy)ethanol (a.k.a. Microstrip).

Figure 17:
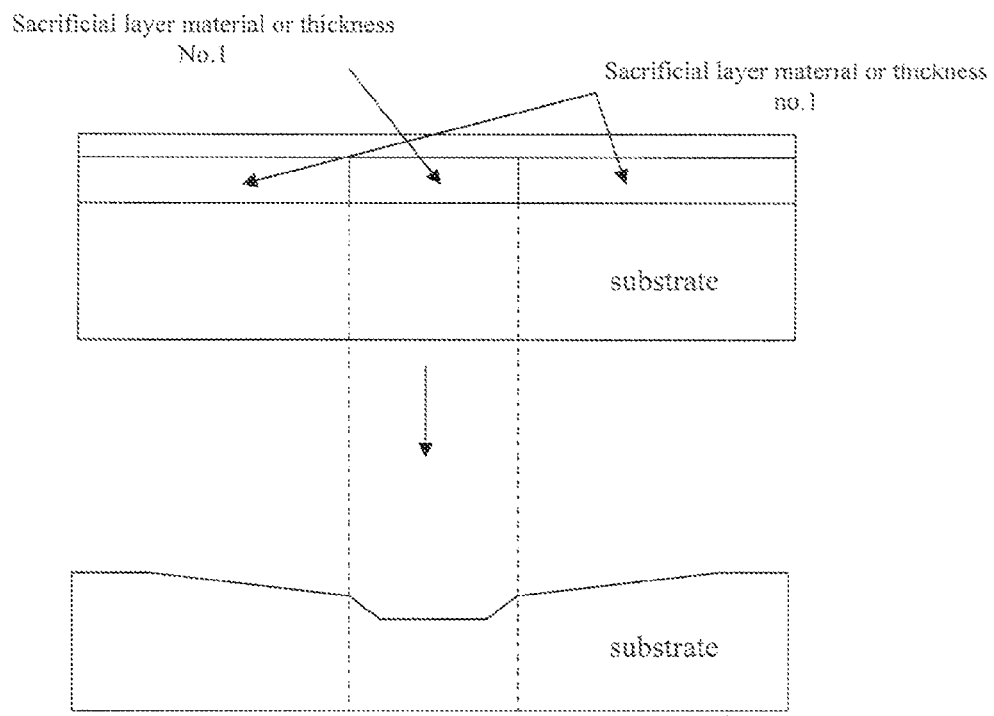
FIG. 17 illustrates a sacrificial layer comprising different sections having different thicknesses, and/or made of different materials, and/or supplied with different bias voltages, and the cavity having varying slope sidewalls etched in a substrate while using the different section sacrificial layer.

In one embodiment, the sacrificial layer 242 comprises different parts made of different materials and/or having different thicknesses in order to vary the inclination angle of the sidewalls, as illustrated in FIG. 17.

Figure 18:
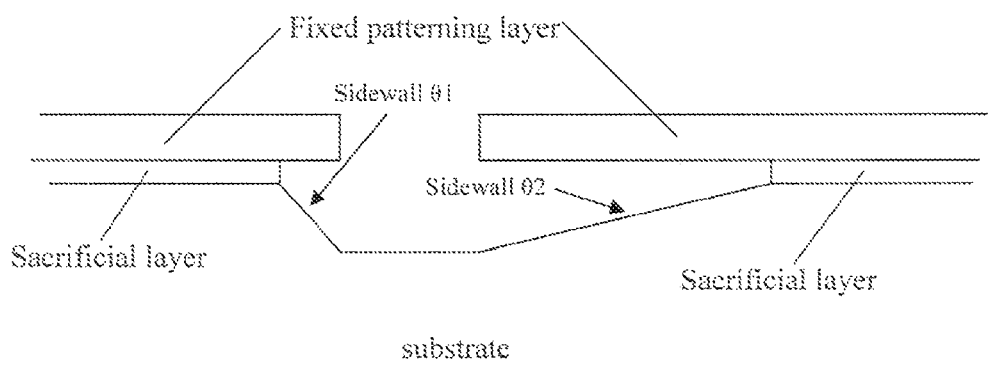
FIG. 18 illustrates an asymmetrical cavity etched in a substrate.

In another embodiment, an asymmetric cavity is etched in the substrate using a sacrificial layer comprising different sections made from different materials and/or having different thicknesses, as illustrated in FIG. 18. For example, the inclination of the right sidewall can be 10 degrees while the inclination angle of the left sidewall is 40 degrees.

While the present description refers to wet-etching, it should be understood that plasma etching can be used for etching the substrate 240 or for etching both the substrate 40 and the sacrificial layer 242.

In one embodiment, the above presented etching method can be used to improve quality of photolithographic patterning of electrodes and electrical connections over microstructured substrates. The method can be used to avoid problems with rounded or steep sidewalls stemming from large variations in the thickness of spin-coated resist and complex propagation patterns of light in the resulting environment. The method can also be used for fabricating microdevices such as microfluidic devices, requiring optimization of the cross-sectional shapes of topographic features for best performance.

In another embodiment, the present etching method can be used in the field of fabrication of membrane valving schemes based on electrostatic actuation. In this case, optimized profiles providing for a lower operating voltage due to the "zipping" action can be achieved.

In a further embodiment, the present method is used for fabricating devices that exploit effects of channel geometry on capillary phenomena. In such cases, the aspect ratio of trapezoidal microchannels influences the critical contact angle and can therefore be tuned to realize selective filling of microchannels.

It should be understood that the above presented method can be used for etching amorphous or crystalline substrate materials. While using the etching methods of the prior art, the etching of amorphous material results in rounded sidewalls and the inclination angle of the sidewalls is dictated by the crystallinity of the substrate for crystalline materials, the inclination angle of cavities etched in amorphous or crystalline materials can be controlled using the above presented etching method.

In one embodiment, the inclination angle θ of the sidewalls 254 is comprised in the following degrees range: ]0°; 45°].

In another embodiment, the inclination angle θ of the sidewalls 254 is comprised in the following degrees range: ]0°; 54.7°].

It should be understood that any appropriate deposition methods may be used to deposit the sacrificial layer on the substrate and the patterning layer on the sacrificial layer. Examples of deposition techniques are chemical vapor deposition (CVD), plasma enhanced CVD (PECVD), physical vapor deposition (PVD), electroplating, electroless plating, and the like.

The embodiments of the present disclosure described above are intended to be examples only. Those of skill in the art may effect alterations, modifications and variations to the particular example embodiments without departing from the intended scope of the present disclosure. The subject matter described herein in the recited claims intends to cover and embrace all suitable changes in technology.

The invention claimed is:

1. A microvalve system comprising:
a first body portion having a fluid channel defined in a face thereof;
an electrode layer disposed on the first body portion within said fluid channel, the electrode layer being electrically connectable to a power source;
a first membrane disposed on the face of the first body portion covering said fluid channel in alignment with said electrode, the first membrane sealingly enclosing the fluid channel;
a second body portion disposed on said face of said first body portion, said second body portion comprising a liquid receiving cavity aligned with said first membrane such that the first membrane separates the fluid channel and the liquid receiving cavity, said liquid receiving cavity containing an electrical conducting liquid therein, an electrical contact being disposed at least partially within the liquid receiving cavity in electrical communication with the electrical conducting liquid and being electrically connectable to said power source;
said first membrane being displaceable between an open valve position, wherein fluid is free to flow through said fluid channel, and an at least partially closed valve position, wherein the first membrane is displaced towards the electrode layer within the fluid channel upon application of an electrical potential difference between said electrode layer and said electrical conducting liquid in order to at least partially obstruct said fluid channel; and
a second membrane wherein said first body portion further includes at least one additional channel in said face that is adapted to receive an additional fluid said second membrane being disposed over said additional channel and wherein said second body portion further comprises an additional cavity fluidly connected to said liquid receiving cavity to form with said first membrane and said second membrane, a hermetically closed chamber which receives said electrical conducting liquid said electrical conducting liquid being substantially incompressible, and wherein the application of said electrical potential difference causes displacement of said first membrane towards said electrode and a corresponding displacement of said second membrane away from said additional channel.

2. The microvalve system as claimed in claim 1, wherein displacement of said first membrane regulates a flow of said fluid in said fluid channel.

3. The microvalve system as claimed in claim 1, wherein said first membrane is stretched to introduce an elastic force in the first membrane.

4. The microvalve system as claimed in claim 1, wherein displacement of said second membrane away from said additional channel regulates a flow of said additional fluid in said additional channel in an inversely proportional manner than the flow in the fluid channel.

5. The microvalve system as claimed in claim 1, wherein said at least one additional channel comprises two additional channels adjacent to one another and separated by a valve seat upon which the additional membrane abuts when in a closed position, and wherein displacement of said additional membrane away from said two additional channels permits flow of said additional fluid from one of said two additional channels to the other of said two additional channels.

6. The microvalve system as claimed in claim 1, wherein said fluid channel is closed and receives a compressible and stationary fluid.

7. The microvalve system as claimed in claim 1, wherein the electrical conducting liquid is a liquid metal alloy.

8. A microvalve s stern co
a first body portion having a fluid channel defined in a face thereof;
an electrode layer disposed on the first body portion within said fluid channel the electrode layer being electrically connectable to a power source;
a first membrane disposed on the face of the first body portion covering said fluid channel in alignment with said electrode, the first membrane sealingly enclosing the fluid channel; and
a second body portion disposed on said face of said first body portion, said second body portion comprising a liquid receiving cavity aligned with said first membrane such that the first membrane separates the fluid channel and the liquid receiving cavity, said liquid receiving cavity containing an electrical conducting liquid therein, an electrical contact being disposed at least partially within the liquid receiving cavity in electrical communication with the electrical conducting liquid and being electrically connectable to said power source;
said first membrane being displaceable between an open valve position wherein fluid is free to flow through said fluid channel and an at least partially closed valve position, wherein the first membrane is displaced towards the electrode layer within the channel upon application of an electrical potential difference between said electrode layer and said electrical conducting liquid in order to at least partially obstruct said fluid channel, wherein said second body portion comprises an opening in communication with said liquid receiving cavity and an additional membrane hermetically closing said opening, said electrical conducting liquid being substantially incompressible and acting as a hydraulic transmission medium between said first membrane and said second membrane, said application of said electrical potential difference causing said displacement of said first membrane towards said electrode and a displacement of said second membrane towards said liquid receiving cavity.

9. The microvalve system as claimed in claim 8, wherein the first membrane has a first surface area and the additional membrane has a second surface area different from the first surface area, the first and second surface areas being chosen such as to provide a predetermined amplification of the actuation force transmitted by the electrical conductive liquid and relative displacement of the first and second membranes.

10. A microvalve system comprising:
a bottom substrate having a channel in a top face;
an electrode disposed in said channel and electrically connectable to a power source;
a channel membrane disposed on top of said channel and aligned with said electrode;
a top substrate disposed on top of said bottom substrate, said top substrate comprising a liquid receiving cavity aligned with said membrane;
an electrical conducting liquid contained in said liquid receiving cavity and electrically connectable to said power source;
said channel membrane being displaceable between an open channel position and an at least partially closed channel position upon application of an electrical potential difference between said electrode and said electrical conducting liquid, and a second membrane wherein said bottom substrate further includes at least one additional channel in said to face that receives an additional fluid said second membrane being disposed over said additional channel and wherein said to e further comprises an additional cavity fluidly connected to said liquid receiving cavity to form, with said channel membrane and said second membrane, a hermetically closed chamber which receives said electrical conducting liquid, said electrical conducting liquid being substantially incompressible, and wherein the application of said electrical potential difference causes displacement of said channel membrane towards said electrode and a corresponding displacement of said second membrane away from said additional channel.

11. The microvalve system as claimed in claim 10, wherein said at least one additional channel comprises two additional channels adjacent to one another and separated by a valve seat upon which the additional membrane abuts when in a closed position, and wherein displacement of said additional membrane away from said two additional channels permits flow of said additional fluid from one of said two additional channels to the other of said two additional channels.

* * * * *